US010994418B2

(12) United States Patent
Kichkaylo et al.

(10) Patent No.: US 10,994,418 B2
(45) Date of Patent: May 4, 2021

(54) DYNAMICALLY ADJUSTING ROADMAPS FOR ROBOTS BASED ON SENSED ENVIRONMENTAL DATA

(71) Applicant: X Development LLC, Mountain View, CA (US)

(72) Inventors: Tatiana Kichkaylo, Mountain View, CA (US); Geoffrey Lalonde, La Honda, CA (US)

(73) Assignee: X Development LLC, Mountain View, CA (US)

( * ) Notice: Subject to any disclaimer, the term of this patent is extended or adjusted under 35 U.S.C. 154(b) by 356 days.

(21) Appl. No.: 15/839,854

(22) Filed: Dec. 13, 2017

(65) Prior Publication Data
US 2019/0176328 A1 Jun. 13, 2019

(51) Int. Cl.
*B25J 9/16* (2006.01)
*G05D 1/02* (2020.01)
(Continued)

(52) U.S. Cl.
CPC .......... *B25J 9/1664* (2013.01); *B25J 13/006* (2013.01); *B65G 1/137* (2013.01); *B66F 9/063* (2013.01);
(Continued)

(58) Field of Classification Search
CPC ........ B25J 9/1664; B25J 13/006; B66F 9/063; B66F 9/24; B66F 9/0755; B65G 1/137;
(Continued)

(56) References Cited

U.S. PATENT DOCUMENTS 7,920,962 B2 * 4/2011 D'Andrea ........ G05B 19/41895
700/245
9,816,822 B1 11/2017 LaLonde et al.
(Continued)

OTHER PUBLICATIONS

J. E. Hopcroft et al., "On the Complexity of Motion Planning for Multiple Independent Objects; PSpace Hardness of the 'Warehouseman's Problem'", The International Journal of Robotics Research, Dec. 1984, vol. 3, Issue 4, pp. 76-88.
(Continued)

*Primary Examiner* — Jeff A Burke
*Assistant Examiner* — Kyle T Johnson
(74) *Attorney, Agent, or Firm* — McDonnell Boehnen Hulbert & Berghoff LLP

(57) ABSTRACT

Systems and methods related to roadmaps for mobile robots are provided. A computing device can determine a roadmap of an environment. The roadmap can include lanes and a designated region that is adjacent to a first lane of the plurality of lanes and suitable for robotic traversal when unoccupied. The computing device can determine a first route between first and second points in the environment that uses the first lane. The computing device can send a direction to use the first route to a first robot. The computing device can receive, from the first robot, sensor data indicative of an occupied status of the designated region. The computing device can determine a second route between the first and second points through the designated region based on the occupied status of the designated region. The computing device can send a direction to use the second route to a second robot.

20 Claims, 12 Drawing Sheets

(51) Int. Cl.

| | | |
|---|---|---|
| *B65G 1/137* | (2006.01) | |
| *G06Q 10/08* | (2012.01) | |
| *B66F 9/075* | (2006.01) | |
| *B66F 9/24* | (2006.01) | |
| *G06Q 50/28* | (2012.01) | |
| *B66F 9/06* | (2006.01) | |
| *B25J 13/00* | (2006.01) | |

(52) U.S. Cl.
CPC .............. *B66F 9/0755* (2013.01); *B66F 9/24* (2013.01); *G05D 1/0231* (2013.01); *G05D 1/0274* (2013.01); *G05D 1/0289* (2013.01); *G05D 1/0297* (2013.01); *G06Q 10/087* (2013.01); *G06Q 50/28* (2013.01); *G05D 2201/0216* (2013.01)

(58) Field of Classification Search
CPC .... G06Q 50/28; G06Q 10/087; G05D 1/0297; G05D 1/0274; G05D 1/0231; G05D 1/0289; G05D 2201/0216
See application file for complete search history.

(56) References Cited

U.S. PATENT DOCUMENTS

| | | | | |
|---|---|---|---|---|
| 9,940,840 | B1* | 4/2018 | Schubert | B61B 3/00 |
| 9,958,864 | B2* | 5/2018 | Kentley-Klay | G01S 17/87 |
| 10,191,495 | B2* | 1/2019 | Bobda | G05D 1/0297 |
| 2002/0095239 | A1* | 7/2002 | Wallach | G05D 1/0295 |
| | | | | 700/245 |
| 2004/0010337 | A1* | 1/2004 | Mountz | G05D 1/0274 |
| | | | | 700/214 |
| 2007/0294029 | A1* | 12/2007 | D'Andrea | G01C 21/005 |
| | | | | 701/410 |
| 2011/0054689 | A1* | 3/2011 | Nielsen | G05D 1/0088 |
| | | | | 700/258 |
| 2012/0165982 | A1* | 6/2012 | Kim | B25J 9/162 |
| | | | | 700/255 |
| 2013/0302132 | A1* | 11/2013 | D'Andrea | G06Q 10/08 |
| | | | | 414/807 |
| 2014/0277691 | A1* | 9/2014 | Jacobus | G06Q 10/087 |
| | | | | 700/216 |
| 2015/0151725 | A1* | 6/2015 | Clarke | B60W 10/18 |
| | | | | 701/28 |
| 2015/0216746 | A1* | 8/2015 | Dirauf | B62D 15/00 |
| | | | | 701/25 |
| 2017/0045894 | A1* | 2/2017 | Canoy | G08G 5/0013 |
| 2017/0185085 | A1* | 6/2017 | Storfer | G05D 1/0212 |
| 2017/0308070 | A1* | 10/2017 | Elazary | G05B 19/41865 |
| 2018/0136652 | A1* | 5/2018 | Jiang | G05D 1/0088 |
| 2018/0178376 | A1* | 6/2018 | Lalonde | B25J 9/1651 |
| 2018/0192059 | A1* | 7/2018 | Yang | G01S 17/86 |
| 2018/0239355 | A1* | 8/2018 | Lee | G06K 9/00805 |
| 2018/0356813 | A1* | 12/2018 | Sun | B25J 9/1664 |
| 2019/0176328 | A1* | 6/2019 | Kichkaylo | B66F 9/063 |
| 2019/0339711 | A1* | 11/2019 | Kwak | G05D 1/0289 |
| 2019/0358814 | A1* | 11/2019 | Park | G05D 1/0291 |

OTHER PUBLICATIONS

T. Kichkaylo, "Roadmap Annotation for Deadlock-Free Multi-Agent Navigation", U.S. Appl. No. 15/486,219, filed Apr. 12, 2017.
J. K. Lenstra, "Complexity of Machine Scheduling Problems", Annals of Discrete Mathematics, 1977, vol. 1, pp. 343-362.
The International Bureau of WIPO, International Preliminary Report on Patentability dated Jun. 25, 2020, issued in connection with International Patent Application No. PCT/US2018/061285, filed on Nov. 15, 2018, 9 pages.

* cited by examiner

DYNAMICALLY ADJUSTING ROADMAPS FOR ROBOTS BASED ON SENSED ENVIRONMENTAL DATA

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robots guided by computer control systems.

Mobile robots can be used in a number of different environments to accomplish a variety of missions or tasks. For example, mobile robots can deliver items, such as parts or completed products, within indoor environments, such as warehouses, hospitals and/or data centers. When mobile robots are deployed, they can use one or more possible paths to and from delivery and/or other locations. These paths can be determined using one or more route planning algorithms.

SUMMARY

In one aspect, a method is provided. A roadmap of an environment is determined. The roadmap includes a plurality of lanes and a designated region adjacent to a first lane of the plurality of lanes. The designated region is suitable for robotic traversal when unoccupied. A first route from a first point in the environment to a second point in the environment by way of at least the first lane of the plurality of lanes is determined. A direction to use the first route to travel through the environment is sent to a first robot in the environment Sensor data is received from the first robot, the sensor data indicative of an occupied status of the designated region. A second route from the first point to the second point through the designated region based on the occupied status of the designated region is determined. A direction to use the second route is sent to a second robot in the environment.

In another aspect, a computing device is provided. The computing device includes a processor. The computing device is configured to: determine a roadmap of an environment, the roadmap including a plurality of lanes and a designated region adjacent to a first lane of the plurality of lanes, where the designated region is suitable for robotic traversal when unoccupied; determine a first route from a first point in the environment to a second point in the environment by way of at least the first lane of the plurality of lanes; send, to a first robot in the environment, a direction to use the first route to travel through the environment; receive, from the first robot, sensor data indicative of an occupied status of the designated region; determine a second route from the first point to the second point through the designated region based on the occupied status of the designated region; and send, to a second robot in the environment, a direction to use the second route.

In another aspect, a non-transitory computer readable medium is provided. The non-transitory computer readable medium has stored thereon instructions, that when executed by one or more processors of a computing device, cause the computing device to perform functions. The functions include determining a roadmap of an environment, the roadmap including a plurality of lanes and a designated region adjacent to a first lane of the plurality of lanes, where the designated region is suitable for robotic traversal when unoccupied; determining a first route from a first point in the environment to a second point in the environment by way of at least the first lane of the plurality of lanes; sending, to a first robot in the environment, a direction to use the first route to travel through the environment; receiving, from the first robot, sensor data indicative of an occupied status of the designated region; determining a second route from the first point to the second point through the designated region based on the occupied status of the designated region; and sending, to a second robot in the environment, a direction to use the second route.

In another aspect, an apparatus is provided. The apparatus includes: means for determining a roadmap of an environment, the roadmap including a plurality of lanes and a designated region adjacent to a first lane of the plurality of lanes, where the designated region is suitable for robotic traversal when unoccupied; means for determining a first route from a first point in the environment to a second point in the environment by way of at least the first lane of the plurality of lanes; means for sending, to a first robot in the environment, a direction to use the first route to travel through the environment; means for receiving, from the first robot, sensor data indicative of an occupied status of the designated region; means for determining a second route from the first point to the second point through the designated region based on the occupied status of the designated region; and means for sending, to a second robot in the environment, a direction to use the second route.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
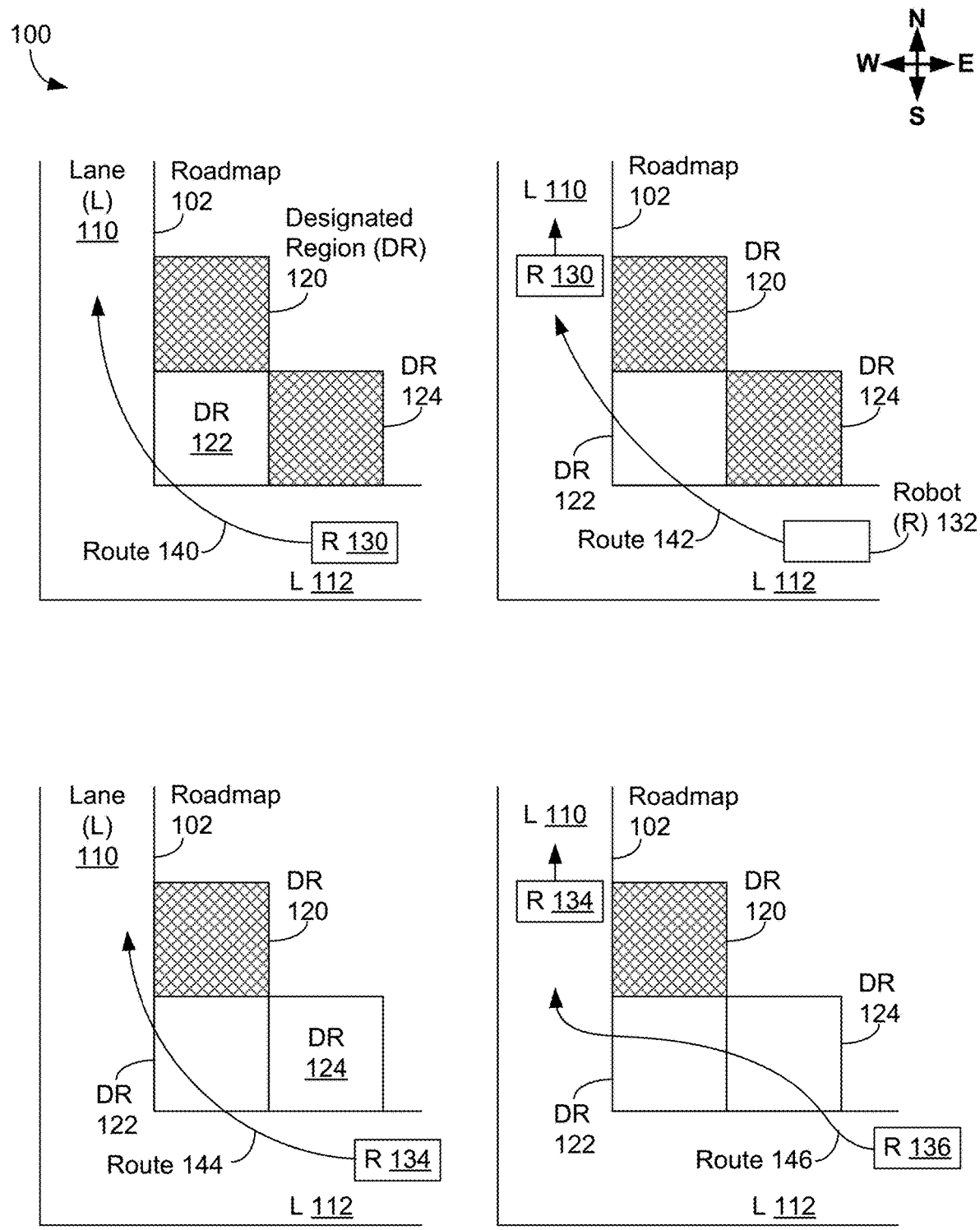
FIG. 1 depicts a scenario related to a roadmap of an intersection in an environment, in accordance with at least some example embodiments.

To accomplish missions within an environment autonomous or semi-autonomous vehicles, such as mobile robotic devices or "robots" for short, can use a "roadmap", or set of "lanes" connected by intersections within an environment, such as one or more warehouses, other buildings, and/or outdoor regions, where the lanes represent predefined paths within the environment. In some cases, a lane can describe a unidirectional predefined path in the environment. The roadmap specifies where robots are allowed to travel within the environment. A roadmap may be determined in an automated manner using an environment layout and/or specified through user input (e.g., via a graphical user interface). One or more computing devices having route planning software can then be used to plan routes for the robots in the environment to enable robots to take routes between locations in the environment along the lanes as specified by the roadmap. Using a fixed roadmap facilitates multi-agent planning as the lanes can be divided into discrete segments, which can be allocated to individual robots by the route planning software.

However, limiting the robots to travel only on predefined lanes may be inefficient or impractical. Allowing for a certain amount of free space planning outside of fixed lanes of a roadmap may be beneficial. For instance, if an area is unoccupied, such as a region of space at a corner of an intersection, a deviation from a lane to use the space may lead to a shorter and/or more efficient path. As another example, it may be necessary for a robot to deviate from a previously-planned route on a lane to get around an unexpected obstacle. However, allowing for unlimited deviation from the roadmap may make multi-agent planning difficult of robots and defeat the purpose of using a roadmap.

Regions of space in the environment can have a status of being either unoccupied or occupied. In some cases, the occupied or unoccupied status or a region of space can be determined based on data sensed in the environment. For example, a robot can use its on-board sensors; e.g., cameras, radar, proximity sensors, LIDAR/laser sensors; to detect whether a region of space, such as a particular pallet location near to an intersection, does not have a pallet or other object. If the on-board sensors detect that the region of space does not have a pallet or other object, the region of space can be classified as unoccupied. However, if the on-board sensors detect that the region of space is not unoccupied, the region of space can be classified as occupied; i.e., at least a portion of an occupied region of space has a pallet or other object. Another term for an occupied region is a full region, and another term for an unoccupied region is an empty region.

Within examples, a roadmap may include one or more "designated regions" adjacent to the lanes. A designated region is a region of space in the environment suitable for robotic traversal when unoccupied. The designated region is adjacent to a first lane of the plurality of lanes. Designated regions can delineate how much deviation is permitted by a robot from a lane, and where the designated region can be occupied at some times and not occupied at others. In some cases, a designated region is a pre-determined region of drivable space that is adjacent to at least one lane that can allow a robot to leave a lane and re-enter the same lane or, in some cases, enter another lane also adjacent to the designated region, where the designated region can be occupied, unoccupied, or, in some cases, partially occupied. By using a hybrid approach with roadmaps and a bounded amount of adjacent free space for free space planning, the benefits of a roadmap for multi-agent planning may be leveraged while avoiding some of the costs associated with restricting robot travel only to predefined lanes. Designated regions can be designated by a user (e.g., warehouse manager) through a user interface and/or through a rule-based approach (e.g., a rule that only space that has the potential to be drivable can be designated for possible robot travel). In some examples, application of such rules and/or designations to create a designated region can be performed on an "on-the-fly" basis from any available free space.

As noted, a roadmap with designated regions allows for an expected amount of deviation by the robots from lanes in the roadmap. This bounded free space planning is beneficial for several reasons. Some example applications of bounded free space planning involve opportunistic routing of robots through certain free space areas when they are available. In particular, robots can be instructed to monitor one or more designated regions to determine which are currently unoccupied. An occupied status of each designated region can be stored as a persistent state in the roadmap. When a robot detects that a designated region is unoccupied or empty, a central planner can receive information that the designated region is unoccupied from the robot and opportunistically adjust routes for other robots before they reach the designated region. As a specific example, a designated region may correspond to a pallet drop-off location at a corner between two perpendicular lanes. Allowing robots to cut the corner through the pallet drop-off location when it is empty may improve overall system efficiency or throughput.

As another example, a deviation from a route can occur as part of an intersection-crossing trajectory optimized for traffic and vehicle type; e.g., a trajectory through an intersection for an average size robot may be inefficient for a smaller robot and/or may be difficult to follow for a larger robot. Further, a route planned for a mission involving interaction with an object assumed to be in a particular position and/or orientation, such as a pallet to be picked up by the robot, may have to be changed to properly position the robot to interact with the object. Other beneficial and/or necessary deviations/changes in routes are possible as well.

A lane may be represented as a lane polygon, which is a polygonal region surrounding a lane that would be taken up by a largest robot in the environment while traveling on the lane; e.g., if the largest robot is X meters wide and is assumed to drive down the middle of a lane that runs straight for Y meters, then the lane polygon would be a rectangle at least X meters wide and Y meters long that would be width-wise centered on the lane. A lane-polygon can be padded, or have extra space. In some cases, a minimum amount of padding can be provided to satisfy safety and/or other standards; e.g., the lane polygon described above could be padded to be X+0.5 meters wide or a predetermined minimum amount of padding width other than 0.5 meters. In some cases, a minimum amount of padding to the length of the lane polygon can be used; e.g., the length padded to be Y+2 meters wide or a predetermined minimum amount of padding length other than 2 meters Additional padding beyond the minimum amount of padding can allow the robot to move slightly off-center and/or to allow the robot to carry an object wider than itself and/or could be longer than Y meters long to account for a robot being partially on the lane, such as when entering and/or exiting the lane. In some cases, lane polygons do not overlap.

In some cases, the environment can include one or more locations of interest; e.g., pallet locations, a location of a charger or other fuel source for robots, a loading dock location, etc. In this document, unless otherwise explicitly stated, the term "pallet" represents a container of one or more goods that can be brought to, stored at, and/or obtained from a warehouse or other environment; e.g., a pallet can include one or more: pallets, boxes, bags, bales, cartons, crates, packages, parcels, and/or other containers (or other objects) associated with goods that can be brought to, stored at, and/or obtained from the environment. A pallet location can be a location where a pallet is expected to be placed for storage within the environment. In some cases, a pallet location includes a pallet drop-off location for placing one or more pallets. Then, a location of interest can be modeled in the roadmap as locations and/or poses within the environment, where a "pose" of a robot is a position and an orientation of the robot. A location of interest may or may not be associated with a lane and/or a designated region.

In some examples, a pallet location can be considered to be occupied when there at least one pallet is at a pallet drop-off location of the pallet location, or can be considered to be unoccupied otherwise. In other cases, finer classifications about an occupied/unoccupied status of a region of space can be used; e.g., a space can be classified as occupied, partially occupied, or unoccupied, where the space is unoccupied using the definition above, the space is occupied if the (most of) the space is used to hold a pallet or other object, and the space is partially occupied if the space is not occupied and if the space is not occupied; a space can be classified using an occupancy percentage or other quantitative designation. In other examples, the occupied or unoccupied status or a region of space can be determined based on non-sensory data; e.g., a region of space can be classified as occupied if the region of space is allocated or otherwise associated with a robot, a pallet, and/or another object; otherwise, the region of space can be classified as unoccupied.

A designated region can be used by a robot based on sensory data indicating the occupied and/or unoccupied status of the designated region. For example, if sensory data provided by a robot about a designated region indicates the designated region is occupied, then the robot (or another robot) can be instructed not to use the designated region for travel. However, if sensory data provided by a robot about the designated region indicates the designated region is unoccupied, then a robot can be instructed to use the designated region for travel. As a more concrete example, suppose a predetermined designated region DR1 is located adjacent to an intersection between two lanes Lane1 and Lane2. A robot going from Lane1 and Lane2 sense the designated region DS1 for occupancy. If designated region DR1 is occupied, then a robot can travel through the intersection to travel from Lane1 to Lane2. However, if designated region DR1 is unoccupied, then the robot can travel from Lane1 through designated region DR1 to Lane2, thereby "cutting the corner" between Lane1 and Lane2. Further the robot can share the occupancy data to other robots and/or with a computing device executing route planning software, enabling planning of a different, perhaps better route from Lane1 to Lane2 (or vice versa) through DR1, than used by the robot.

Route planning software can be used to allocate one or more regions of space in the environment to one or more robots, plan routes for the one or more robots, and plan deviations in the routes for the one or more robots. A region of space allocated to one robot cannot be used by any other robot; that is, if a region of space RS1 is allocated to robot R1, only robot R1 can use region of space RS1. In some cases, the route planning software can allocate lanes and/or designated regions and/or lane polygons to a robot for the robot's exclusive use and/or deallocated from the robot for some other use; e.g., to become idle, for use by another robot.

The route planning software can plan a route for a robot and allocate part or all of a space required for the robot to travel on the route to the route. As a more specific example, route planning software can determine a route for a robot R1 currently on a lane L1 and can allocate part or all a lane polygon starting at robot R1's current position to R1; e.g., allowing robot R1 to freely travel along the allocated (portion of) lane L1. In some cases, the route planning software can also allocate an arbitrary polygon, circle, or other region of space to a robot to ensure that spaces allocated to different robots do not overlap.

The route planning software can plan routes and allocate space based on planned routes, mission needs occupancy/unoccupied statuses, and/or other information sensed or otherwise detected by one or more robots operating in the environment. The route planning software can consider the environment to include lanes and designated regions of the roadmap to be part of drivable space, or a set of one or more connected regions suitable for robotic traversal, and allocate one or more portions of drivable space to a robot as part of route planning for the route. In some examples, drivable space can include undrivable sub-spaces; e.g., locations where pallets or obstacles are located, locations too small for a robot to move, etc.

In some examples, the route planning software can be executed by a central planner, which can be one or more computing devices executing central planning software to perform at least some of the herein-described functionality of a central planner, where the central planning software includes the route planning software. The central planner can use the central planning software to perform route planning, behavior assignment, mission assignment, and/or mission sequencing for one or more robots in the environment. Then, the central planner can track all active and pending missions, assignment of mission to robots, and allocations of regions of space to various robots.

The central planner can direct a robot to perform one or more particular "behaviors" at a particular time as part of route planning and/or other planning for the robot. Example behaviors include, but are not limited to, traveling (e.g., moving), picking (e.g., getting a pallet), placing (e.g., dropping off a pallet), passing (e.g., traveling through intersections, moving around an obstacle, pallet, robot, or human), positioning (e.g., moving between poses), waiting, parking, and charging (e.g., charging batteries, getting refueled).

Then, the central planner can direct a robot to perform a sequence of behaviors to travel along a route and/or perform a mission. Assuming no discovery of unexpected pallets, humans, obstacles, etc. along a route, the robot can then execute the sequence of behaviors provided by the central planner to carry out the mission. In some examples, the central planner can direct the robot to assume an initial pose. In other examples, the robot and/or the central planner can maintain a flag or other data item indicating whether the robot is or is not carrying a pallet or other object.

The central planner can use the route planning software to plan routes and/or deviations in routes by determining whether a robot can travel from a starting pose to an ending pose while remaining in a particular region of space that includes the starting and ending poses. For example, given starting and ending poses of a robot, a first polygon or other shape (e.g., a circle), and possibly a speed limit for the robot, the central planner can either determine (a) an available trajectory for the robot to travel from the starting pose to the ending pose while the robot remains entirely within the first polygon or other shape throughout or (b) determine that such a trajectory is unavailable. If the central planner does find an available trajectory, the central planner can also provide a time estimate for the robot to travel along the available trajectory, where the time estimate can include an estimated time, a mean estimated time, a standard deviation associated with the mean estimated time, and/or other estimation information. In some cases, an otherwise available trajectory can be classified as unavailable if the time estimate for the otherwise available trajectory exceeds a predetermined amount of time. In some cases, the central planner can provide a second, alternative polygon or other shape to the first polygon or other shape along with the trajectory, where the second polygon or other shape does not exceed the bounds of the first polygon or other shape. Some data can be cached by the central planner, such as time estimates for traveling through a polygon that includes an intersection of lanes. Then, the free-central planner can update time estimates over time based on observed/actual robotic performance.

The central planner can perform path planning for directing a robot along a route in the environment. As outputs of path planning, the central planner can provide a curve, which may be a straight line, and a speed limit for the robot to follow while traveling along one or more lanes and/or designated regions. If the central planner cannot find a curve and speed limit for the robot to follow while performing path planning, then the central planner can output a "No" value indicating that no path is available at this time; e.g., an obstacle is obstructing a lane associated with the path being planned.

In one model, one central planner can control one or more robots at one location Locl; e.g., at one warehouse. The central planner can communicate with the robot(s) at location Locl in terms of missions, sequences of behaviors, trajectories, polygons (or other spaces) reserved for use by the robot, etc., as discussed above. Each robot can include a motion planner to control motions of the robot during a mission, where the motion planner can operate in terms of starting and ending poses, lanes/routes for use during the mission, speed limits, pallets, and bounding polygons. For example, the motion planner for a robot can be one or more computing devices of the robot executing motion planning software to perform at least some of the herein-described functionality of a motion planner.

The central planner and a motion planner for a robot can cooperate to determine routes for the robot. As an example, let a robot R1 be on a lane L1 that leads to a pick location LOC1 that is associated with R1's mission, where LOC1 is relatively close to, but just outside of a lane polygon enclosing L1. The central planner can allocate a region of space to robot R1 that enables R1 to travel from lane L1 to LOC1. To allocate the region of space, the central planner chooses a closest point CP1 on lane L1 (or on the lane polygon for lane L1) to location LOC1 and constructs a region of space RS1 having enough area to enclose a trajectory enabling robot R1 to travel from CP1 on lane L1 to LOC1. The central planner can then direct the motion planner of R1 to determine: a trajectory starting at CP1 to LOC1, motions for picking up a pallet PAL1 at LOC1, and a trajectory for returning to lane L1 with pallet PAL1 while staying within region of space RS1. The motion planner can then determine an actual region of space ACT1 and a time estimate TE1 to move robot R1 from CP1 to CP2 while picking up PAL1, where actual region ACT1 can fit within region of space RS1. The central planner can allocate region ACT1 to robot R1, which can include allocating portions of lane L1, designated regions in ACT1, and/or portions of other lanes than L1 in ACT1 to robot R1. In some examples, robot R1 may have to wait for actual region ACT1 is allocated; e.g., a lane L2 intersecting region ACT1 could be allocated to another robot R2, thereby inhibiting the central planner from allocating ACT1 to robot R1 until the portion of lane L2 intersecting region ACT1 is deallocated from robot R2; thereby causing robot R1 to wait for robot R2.

Prior to allocating region ACT1, the central planner can then direct robot R1 to travel on lane L1 to a location LOC2 where actual region ACT1 intersects lane L1 and then switch to a waiting behavior. The central planner then waits until regions of lane polygons for lanes L1 and L2 are cleared by other robots, including robot R2, and then allocates actual region ACT1 to robot R1. After allocating region ACT1 to robot R1, the central planner then directs robot R1 to switch to a picking behavior to travel from location LOC2 to pick up pallet PAL1, and after picking up pallet PAL1, to travel to location CP2 on lane L1. After completing the picking behavior—that is, picking up pallet PAL1 and reaching location CP2—robot R1 reports completion of the picking behavior to the central planner. The central planner then deallocates region ACT1 from robot R1, and switches the robot to a travel behavior to travel on lane L1 toward a destination.

In some cases, a region of space provided by the central planner to perform a behavior by a robot is rejected by the robot's motion planner as not being feasible, such as not providing enough room for a trajectory to perform the behavior. In related cases, even when a solution is possible, the robot's motion planner can arrive at a trajectory within a region of space that takes an infeasible amount of time; e.g., involves one or more maneuvers that are too tight and/or slow for the robot to feasibly perform. In these related cases, the central planner can change the trajectory determined by the robot's motion planner and/or have the robot switch to a waiting behavior.

The central planner can direct a robot to perform one or multiple behaviors, sometimes as part of one operation, such as the pick operation performed by robot R1. For example, before allocating region ACT1 to robot R1, if portions of ACT occupied by lane polygons of lanes L1 and L2 are clear of other traffic before robot R1 gets to location LOC2, R1 can be given a "lease" or indication of allocation for region ACT1 before reaching LOC2, so that the robot can start maneuvering to pick pallet PAL1 without waiting at LOC2 for authorization to enter into ACT1. Also, the central planner can send the direction to the motion planner of robot R1 to determine the trajectory starting at CP1 on lane L1 to LOC1 of pallet PAL1 in advance of R1's reaching location CP1. By providing the direction in advance of the use of the trajectory and related allocation of ACT1, the motion planner for robot R1 is given enough time to compute a good trajectory and shape of region ACT and to cache the resulting trajectory and region shape. Then, when the central planner actually directs robot R1 to perform the pick operation using the trajectory within region AT1, robot R1 can immediately start execution of the pick operation.

Pass behavior for a robot can involve route planning. The pass behavior can be used when a robot needs to switch lanes; e.g., to cross an intersection or turn around or pass an unexpected obstacle, which can be a stationary obstacle, e.g., a misplaced pallet, or a mobile obstacle; e.g., a slow-moving robot, where the pass behavior can be carried out only when in accordance with safety regulations and/or rules. For the pass behavior, the central planner sends a direction to a robot's motion planner with a starting pose, ending (or target) pose, and a bounding region of space for performing the pass behavior. In response to the direction, the motion planner returns a possibly smaller bounding polygon or other region of space (e.g., a circle) and a time estimate to perform the pass behavior. The central planner then selects a second bounding region of space from either the original bounding region of space or, if received, the bounding polygon/region provided by the robot's motion planner. When the robot is ready for the pass behavior, the central planner tells the robot to travel to a point just before the second bounding region of space on a lane and wait; i.e., for the central planner to allocate the second bounding region of space to the robot. When the second bounding region of space is clear, the central planner allocates the second bounding region of space to the robot and then directs the robot to perform the pass behavior. When the robot has completed the pass behavior, the robot will be on some point on a destination lane within the allocated second bounding region of space. The central planner deallocates the second bounding region of space from the robot, and directs the robot to switch from pass behavior to another behavior; e.g., travel behavior on the destination lane.

For example, suppose that robot R1 is performing a pass behavior through an intersection of lanes LA and LB from a point A on lane LA to a point B on lane LB and requests allocation of a polygon enabling R1 to pass through the intersection. At the same time, suppose another robot R2 requests to perform a pass behavior through the intersection of lanes LA and LB from a point C on lane LA to a point D on lane LB and requests allocation of a polygon enabling R2 to pass through the intersection. If at least one of robots R1 and R2 can make a relatively-tight turn through the intersection, then both robots can pass through the intersection at the same time. In this particular example, robot R1 can make the relatively-tight turn, but the motion planner for robot R1 provides a relatively-large time estimate for traveling along a trajectory that includes the relatively-tight turn through the intersection. Upon receiving the relatively-large time estimate, the central planner can request robot R1's motion planner to provide a second trajectory and time estimate based on a polygon that includes the entire intersection between lanes LA and LB. In this example, the second time estimate is faster, as robot R1 can use a wider turn radius and thereby move more quickly through the intersection. Given the time estimates from robots R1 and R2, the central planner can determine whether both robots R1 and R2 can go through the intersection at once, or whether robot R1 (or R2) should wait for robot R2 (or R1) before entering the intersection.

The central planner can track allocation of space within the environment; e.g., at least portions of lanes and/or designated regions, to various robots and mission assignments. In some cases, the central planner may reassign missions between robots. For example, if two robots are still heading towards respective pick locations, but neither robot is yet carrying a pallet, the robots' missions can be swapped.

A central planner can design a complete, tentative plan for each robot in terms of lanes and designated regions, but may not send the tentative plan to the robot immediately upon design. The tentative plan may geometrically overlap with plans for other robots. For example, the central planner can assign a mission to robot to pick up a pallet. In this example, the central planner can design a tentative plan for the robot to complete the mission, where the tentative plan includes travel segments for the robot to use travel behaviors to move to the pallet, going through one intersection where the robot uses passing behaviors, and a pick behavior to get the pallet along with a related positioning behavior to align the robot with the pallet before picking. If the central planner sends the tentative plan to the robot, the tentative plan can be considered an actual plan, as the robot will interpret the received plan as instructions to carry out the above-mentioned behaviors to carry out the mission.

The central planner can send plans/behaviors to robots such that regions of drivable space associated to the robots do not overlap. For example, suppose two robots R3 and R4 are traveling on the same lane L3 with R3 leading R4 on L3 and that both R3 and R4 are directed to travel to the end of L3. Then, the central planner can assign following robot R4 to a portion of a lane polygon surrounding lane L3 that stops before a last reported location of leading robot R3. Leading robot R3 can be allocated a portion of the lane polygon of lane L3 from just behind the last reported location to the end of L3 (and possibly beyond) if no other robots are in front of R3 on L3. As the central planner receives position updates from robot R3, the central planner can send updated allocations along lane L3 to robot R4 based on the received reported position(s) of robot R3. In cases where lanes are unidirectional, robots R3 and R4 cannot back up on lane L3, as that goes against the unidirectionality of lane L3. So, an updated allocation can extend R3's portion of the lane polygon of lane L3, but should not reduce that portion in a direction of travel along lane L3. Once robot R3 has been allocated to portion of the lane polygon for lane L3, robot R3 can travel along the allocated portion of the lane polygon without slowing until coming close to the end of the allocated portion.

A robot may fail to carry out a travel behavior due to some obstacle in the path. Since the central planner only allocates a region of drivable space to one robot at a time; i.e., allocations of regions of drivable space do not overlap, a collision will not occur merely due to the presence of an obstacle in an allocated region of drivable space. When the central planner receives an indication of the failure of the travel behavior and/or an indication of a location of an obstacle, the central planner can issue new plans for one or more robots to reroute around the obstacle. In cases where lanes are unidirectional and a robot R_VERSUS is to go against the unidirectionality of a lane L_VERSUS; e.g., to avoid an obstacle, to get in a proper pick position, the central planner can allocate a designated region of lane L_VERSUS to robot R_VERSUS and then send a travel behavior to R_VERSUS to go against the unidirectionality of a lane L_VERSUS within the designated region.

In some cases, if the central planner receives an indication of a location of an obstacle, the central planner can request human or other entity intervention to clear the obstacle and/or perform other activities. As even another example, one or more hardware and/or software failures that cause a robot to be unable to move and/or move with a restricted range and/or velocity of movement can be reported to the central planner as a rationale for failing to perform a behavior. If indication of a robot being unable to move leads to failure of a behavior to be performed by the robot, then the central planner can request human or other entity intervention to repair the failing robot, move the failing robot so as not to be an obstacle to other robots, check the robot's status, and/or perform other activities. If human or other entity intervention is requested, then the central planner can allocate a region of space in the environment to the human or other entity to give the human/other entity space to perform the requested intervention. In cases where a robot sends the central planner an indication of failure to perform a behavior that is part of a mission, then the central planner may reassign the robot to a different mission and/or assign a different robot to perform the mission.

In other approaches using route planning with roadmaps, the roadmap can be a discrete graph of edges and nodes, where a robot is expected to always stay on the edge, even while carrying out a mission (e.g., performing a "pick and place" operation to get or "pick" one or more pallets and/or other objects at one location and "place" or take the pallet(s) to another location). Then, route planning can involve reliance on a conflict graph indicating conflict locations occupied by and/or soon to be occupied by multiple robots, pallets, humans, obstacles, etc. that overlays the roadmap so that route planning can coordinate robot routing through conflict locations to avoid collisions, obstacles, and/or for human safety. A robot's deviation from a lane can cause the robot to create a conflict location not represented by the conflict graph, potentially putting the robot in conflict with routes of other robots. However, as mentioned above, controlled deviations from a discrete route can be beneficial and/or necessary.

The herein-described central planner can plan routes and deviations in routes to flexibility for routing and re-routing, where routing and re-routing can occur based on conditions sensed by robots in an environment; e.g., occupancy statuses of designated regions. The central planner can both take advantage of positive conditions, such as using unoccupied regions to decrease travel time and/or make travel feasible for robots, and address negative conditions, such as unexpected obstacles or incorrectly placed and/or positioned pallets. This flexible approach to robotic control both increases efficiency and productivity of the now-more-flexible robots as directed by the central planner and reduces the need for human intervention, thereby saving human effort, time, and related costs. Further, the central planner can provide one or more behavioral instructions to the robots as part of a direction to complete a mission. These behavior-related instructions make it easier for a planner to direct robots by considering behaviors rather than lower-level details, as well as enable flexibility in robotic design and local control to allow a motion planner and/or other functionality of a robot to perform a directed behavior in any feasible manner. The specification and use of designated regions can both simplify planning tasks, as route planning throughout the environment can be reduced to route planning throughout the environment utilizing only designated regions, and allow for more flexibility than route planning based on lanes and intersections alone. This flexibility is provided by robotic sensing of at least some designated regions that allows for re-routing through designated regions based on the sensed occupancy of designated regions, as well as by cooperating with a robot-based motion planner. Further, by restricting robotic travel to predetermined lanes and designated regions, safety of non-robotic actors; e.g., humans, in the environment can be enhanced as the non-robotic actors can be assured that a robot will only travel in the predetermined lanes and designated regions.

Dynamically Adjusting Roadmaps Based on Sensed Data

FIG. 1 depicts scenario 100 related to roadmap 102 of an intersection in an environment, in accordance with at least some example embodiments. Scenario 100 involves robots (Rs) 130, 132, 134, 136 carrying out their respective missions, where each of their missions causes them to go from lane (L) 112 to lane 110. Additional requirements may be imposed on lanes; e.g., at least one cycle is formed by the lanes in an environment, to distinguish lanes from other types of pathways in the environment.

Prior to scenario 100, roadmap 102 was determined with lanes 110 and 112 and designated regions (DRs) 120, 122, 124. In roadmap 102 depicted in FIG. 1, lane 112 is a westward path that intersects lane 110, which is a northward path. Lane 112 is adjacent to designated regions 122 and 124, and lane 110 is adjacent to designated regions 120 and 122—designated region 122 is adjacent to both lanes 110 and 112. In scenario 100, each of robots 130, 132, 134, 136 is controlled by a central planner (not shown in FIG. 1) and each of robots 130, 132, 134, 136 and the central planner have access to roadmap 102.

At the onset of scenario 100 as shown at upper left of FIG. 1, the central planner directs robot 130 to perform a mission, where the mission involves traveling from a point A in the environment represented by roadmap 102 to a point B in the environment by way of lane 112 and lane 110. The central planner then determines a route from point A to point B via lane 112 and then lane 110 and sends robot 130 a travel behavior that includes the route from point A to point B.

Upon receiving the travel behavior, robot 130 interprets the travel behavior as a direction to use the route from point A to point B to travel through the environment and begins traveling upon the route. Upon approaching designated regions 120, 122, and 124, robot 130 uses its on-board sensors to obtain sensor data SD_130 indicative of an occupied status of each of designated regions 120, 122, and 124. In scenario 100, the occupied status of a designated region can either be unoccupied (or empty) or occupied (or full)—FIG. 1 shows occupied designated regions using cross hatching and unoccupied designated regions without using cross-hatching.

At this point in scenario 100, the sensor data SD_130 obtained by robot 130 indicates that designated regions 120 and 124 are both occupied and that designated region 122 is unoccupied. Robot 130 then sends sensor data SD_130 to the central planner. Robot 130 then takes route 140 from lane 112 to lane 110 through a portion of designated region 122, as sensor data SD_130 indicated designated region 122 was empty and so robot 130 could proceed through designated region 122 to reach lane 110. After completing route 140, robot 130 proceeds on to point B.

Scenario 100 continues, as shown at upper right of FIG. 1, with the central planner directing robot 132 to perform a mission involving traveling from point A to point B by way of lanes 112 and 110. As the central planner has been informed that designated region 122 is not occupied via sensor data SD_130, the central planner determines a route for robot 132 from point A to point B that includes route 142. As shown in FIG. 1, route 142 goes through the unoccupied designated region 122. The central planner sends robot 132 a travel behavior that includes the route from point A to point B that includes route 142. Upon receiving the travel behavior, robot 132 interprets the travel behavior as a direction to use the route from point A to point B, including route 142, to travel through the environment and begins traveling upon the route. Upon approaching designated regions 120, 122, and 124, robot 132 uses its on-board sensors to obtain sensor data SD_132 indicative of an occupied status of each of designated regions 120, 122, and 124. At this point in scenario 100, the sensor data SD_132 obtained by robot 132 indicates that designated regions 120 and 124 are both occupied and that designated region 122 is unoccupied; that is, sensor data SD_132 provides the same occupancy data about designated regions 120, 122, 124 as sensor data SD_130. Robot 132 then sends sensor data SD_132 to the central planner, proceeds to take route 142 from lane 112 to lane 110 on its way to point B.

Scenario 100 continues, as shown in lower left of FIG. 1, with the central planner directing robot 134 to perform a mission involving traveling from point A to point B by way of lanes 112 and 110. As the central planner has been informed that designated region 122 is not occupied via sensor data SD_130 and SD_132, the central planner determines a route for robot 134 from point A to point B that includes route 144. As shown in FIG. 1, route 144 goes through the unoccupied designated region 122. The central planner sends robot 134 a travel behavior that includes the route from point A to point B that includes route 144. Upon receiving the travel behavior, robot 134 interprets the travel behavior as a direction to use the route from point A to point B, including route 144, to travel through the environment and begins traveling upon the route. Upon approaching designated regions 120, 122, and 124, robot 134 uses its on-board sensors to obtain sensor data SD_134 indicative of an occupied status of each of designated regions 120, 122, and 124. At this point in scenario 100, the sensor data SD_134 obtained by robot 134 indicates that designated region 120 is occupied and that both designated regions 122 and 124 are unoccupied; that is, sensor data SD_134 provides an indication that designated region has changed from being occupied according to sensor data SD_130 and SD_132 to now being unoccupied. Robot 134 then sends sensor data SD_134 to the central planner, proceeds to take route 144 from lane 112 to lane 110 on its way to point B. In other scenarios, after sensing that both designated regions 122 and 124 are unoccupied, robot 134 takes a route that proceeds from lane 112 through both of designated regions 122 and 124 to lane 110 rather that route 144 (which does not use designated region 124).

Scenario 100 continues, as shown at lower right of FIG. 1, with the central planner directing robot 136 to perform a mission involving traveling from point A to point B by way of lanes 112 and 110. As the central planner has been informed that designated regions 122 and 123 are unoccupied via sensor data SD_134, the central planner determines a route for robot 136 from point A to point B that includes route 146. As shown in FIG. 1, route 146 goes through both unoccupied designated regions 122 and 124. The central planner sends robot 136 a travel behavior that includes the route from point A to point B that includes route 146. Upon receiving the travel behavior, robot 136 interprets the travel behavior as a direction to use the route from point A to point B, including route 146, to travel through the environment and begins traveling upon the route. Upon approaching designated regions 120, 122, and 124, robot 136 uses its on-board sensors to obtain sensor data SD_136 indicative of an occupied status of each of designated regions 120, 122, and 124. At this point in scenario 100, the sensor data SD_136 obtained by robot 136 indicates that designated region 120 is occupied and that both designated regions 122 and 124 are unoccupied; that is, sensor data SD_136 provides the same occupancy data about designated regions 120, 122, 124 as sensor data SD_134. Robot 136 then sends sensor data SD_136 to the central planner, proceeds to take route 146 from lane 112 to lane 110 on its way to point B. After robot 136 reaches point B, scenario 100 is completed.

Figure 2:
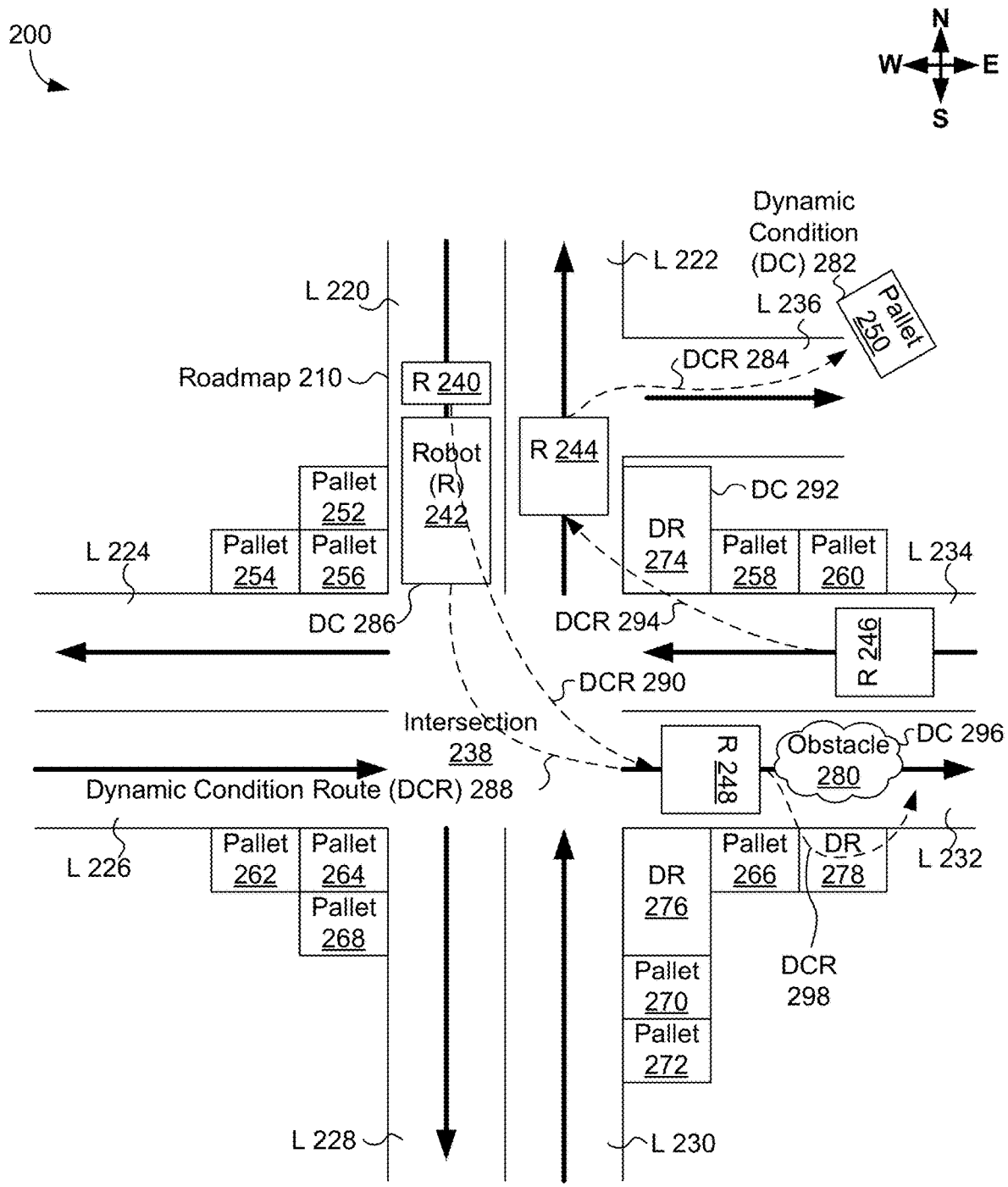
FIG. 2 depicts a scenario related an intersection in an environment, in accordance with at least some example embodiments.

FIG. 2 depicts scenario 200 related to a roadmap 210 of an intersection 238 in an environment, in accordance with at least some example embodiments. Scenario 200 involves robots 240, 242, 244, 246, 248 carrying out their respective missions, where each of their missions causes them to be at or near intersection 238 at an onset of the scenario.

Roadmap 210 shows that intersection 238 is formed at the intersection of eight lanes 220, 222, 224, 226, 228, 230, 232, 234. Lane 220 is a southward path directed toward intersection 238 and is adjacent to lane 222, which is a northward path directed away from intersection 238. Lane 224 is a westward path directed away from intersection 238 and is adjacent to lane 226, which is an eastward path directed toward intersection 238. Lane 228 is a southward path directed away from intersection 238 and is adjacent to lane 230, which is a northward path directed toward from intersection 238 Lane 232 is an eastward path directed away from intersection 238 and is adjacent to lane 234, which is a westward path directed toward intersection 238. Roadmap 210 also shows eastward lane 236 which is adjacent to lane 222. FIG. 2 depicts each lane of scenario 200 as an arrow indicating a direction of the lane and surrounded by a lane polygon selected to enable a travel behavior of a largest robot in the environment along the lane.

Roadmap 210 indicates that robots 240, 242, 244, 246, and 248 are near intersection 238. FIG. 2 shows that, at the onset of scenario 200, robots 240 and 242 are on lane 220 with robot 242 near to intersection 238 and robot 240 following robot 242; robot 244 is on lane 222 near an intersection of lanes 222 and 236; robot 246 is on lane 234 and is not directly adjacent to intersection 238; and robot 248 is on lane 232 just past intersection 238. In scenario 200, robots 244 and 246 are of the same size, robot 248 is slightly smaller than robots 244 and 246, robot 242 is somewhat larger than robots 244 and 246 and robot 240 is smaller than robot 248. In scenario 200, each of robots 240, 242, 244, 246, 248 store a copy of roadmap 210 and data, including routing and behavioral data related to their respective missions (e.g., a list of behaviors and related routing information that each robot can use to carry out its mission). FIG. 2 also shows that, at the onset of scenario 200, lane 232 is mostly obstructed by obstacle 280, which is located just north of designated region 278 and mainly northeast of pallet 266.

Roadmap 210 shows a number of pallets 250, 252, 254, 256, 258, 260, 262, 264, 266, 268, 270, and 272 and designated regions 274, 276, 278 near intersection 238. Pallet 250 is just past an eastern end of lane 236 and is at an angle of approximately 60° to lane 236. Pallets 252, 254, and 256 are located near a junction of lanes 220 and 224 and adjacent to one or both of lanes 220 and 224. Pallets 258 and 260 are located adjacent to lane 234 and are separated from a junction of lanes 234 and 236 by designated region 274, which is adjacent to both lanes 234 and 236 and is south of a point where lane 236 branches eastward from of lane 222.

Pallets 262, 264, and 268 are located near a junction of lanes 226 and 228 and adjacent to one or both of lanes 226 and 228. Pallet 266 is adjacent to lane 232 and is separated a junction of lanes 230 and 232 by designated region 276, which is adjacent to both lanes 230 and 232. Pallet 266 is also adjacent to designated region 278, which is adjacent to lane 232 and just east of pallet 266. Pallets 270 and 272 are adjacent to each other and to lane 230, with pallet 270 being adjacent to designated region 276 as well.

Scenario 200 continues with robot 244 performing a mission involving getting pallet 250. When robot 244 reaches a position near a junction of lanes 222 and 236; e.g., the location of robot 244 shown in FIG. 2, robot 244 obtains sensor data from its on-board sensors indicating dynamic condition (DC) 282 that pallet 250 is not in an expected pose for the robot to pick the pallet. Robot 244 sends the sensor data about dynamic condition 282 to a central planner (not shown in FIG. 2). A dynamic condition is a condition related to a mission and/or an environment of a robot that may lead to a change in a pose, route, and/or mission of the robot to adjust to the condition. In at least some cases, a dynamic condition can be a condition related to a mission and/or an environment of a robot that is detected or otherwise determined using data sensed in an environment by a robot and/or conditions that are specific to a robot. Some example dynamic conditions include a condition based on occupied or unoccupied (e.g., free or empty) status of a region of drivable space, such as a free region; a condition related to a pose of a robot; a condition related to a pose of one or more objects in the environment; a condition related to a type of a robot, a condition related to a status of the robot as carrying (or not carrying) a pallet or other object, a condition related to other data about the robot; e.g., one or more kinematic parameters of the robot, an identity/name of a robot, a maintenance status of the robot, a charging/fuel status of the robot. In other cases, data related to a dynamic condition can be sensed by a robot using one or more sensors; e.g., one or more of sensors 1120 discussed below. Other dynamic conditions are possible as well.

In this specific example, dynamic condition 282 is that pallet 250 is in an unexpected position. Then, to adjust to dynamic condition 282, the central planner and a motion planner of robot 244 can determine a new "dynamic condition route" (DCR) for robot 244 that takes dynamic condition 282 into account.

In particular, the central planner and the motion planner of robot 244 determine dynamic condition route 284, which is a trajectory to pick up pallet 250 at its current position. After determining dynamic condition route 284, the central planner instructs robot 244 to take dynamic condition route 284 as part of a travel behavior to approach pallet 250. After taking dynamic condition route 284, a pose of robot 244 enables robot 244 to perform a pick behavior to pick up pallet 250. After picking up pallet 250, robot 244 continues on the remainder of its mission.

Scenario 200 continues with the central planner directing both robots 240 and 242 to travel from lane 220 through intersection 238 onto lane 232. As robot 242 is a relatively-large robot, robot 242 has to take a relatively-wide path through intersection 238. Robot 240, which is following robot 242 through intersection 238, is a relatively-small robot and therefore can take a relatively-tight path through intersection 238. In scenario 200, the central planner recognizes dynamic condition 286 based on sizes and/or other classifications (e.g., types) of robots 240 and 242 and their different feasible paths through intersection 238. For example, dynamic condition 286 is a condition based on routing two different types of robots both seeking to cross a same intersection, where one route; e.g., dynamic condition route 288, is associated with a robot having a type (or other classification) related to a relatively-large robot, and where another route; e.g., dynamic condition route 290, is associated with a robot having a type (or other classification) related to a relatively-small robot. After determining that dynamic condition 286 is true, the central planner sends a direction to robot 242 to take dynamic condition route 288 at a relatively-slow speed and sends a direction to robot 240 to take dynamic condition route 290 at a relatively-high speed. After receiving these two directions, robot 242 takes dynamic condition route 288 at the relatively-slow speed while robot 240 takes dynamic condition route 290 at the relatively-high speed, enabling both robots 240 and 242 to travel through intersection 238 at the same time. As a result of taking dynamic condition routes 288 and 290, robot 240 reaches lane 232 before robot 242.

Scenario 200 proceds with robot 246 following a travel behavior to travel on lane 234 toward intersection 238. While performing this travel behavior, robot 246 uses its on-board sensors to detect dynamic condition 292 that designated region 274 (adjacent to both lanes 234 and 222) is an unoccupied region. Then, robot 246 sends a message to the central planner with information about dynamic condition 292. Robot 246 also sends a broadcast message to any robot capable of receiving the broadcast message with the information about dynamic condition 292. In scenario 200, a broadcast message is sent by a robot to inform other robots about a status of a designated region or other condition in the environment. In particular, each of robots 240, 242, 244, and 248 receive the broadcast message sent by robot 246 indicating that designated region 274 is an unoccupied region.

After receiving the information about dynamic condition 292, the central planner and a motion planner of robot 246 determine dynamic condition route 294 from lane 234 to lane 222 through designated region 274. The central planner allocates space to robot 246 to take dynamic condition route 294, where the allocated space includes portions of lane 234, designated region 274, and lane 222. After allocating this space, the central planner directs robot 246 to perform a travel behavior taking dynamic condition route 294 from lane 234 to lane 222. After receiving the travel behavior, robot 246 takes dynamic condition route 294 from lane 234 to lane 222.

Scenario 200 continues with robot 248 following a travel behavior to travel on lane 232 away from intersection 238. While performing this travel behavior, robot 248 uses its on-board sensors to detect dynamic condition 296 that (i) obstacle 280 occupies much of lane 232; i.e., the portion of lane 232 is an occupied region and (ii) adjacent designated region 278 is actually free; e.g., designated region 278 is an unoccupied region. Then, robot 248 sends a message to the central planner with information about dynamic condition 296. Robot 248 also sends a broadcast message to any robot capable of receiving the broadcast message with the information about dynamic condition 296—in scenario 200, each of robots 240, 242, 244, and 246 receive the broadcast message sent by robot 248 indicating that a portion of lane 232 is an occupied region and that designated region 278 is an unoccupied region. After receiving the information about dynamic condition 296, the central planner and a motion planner of robot 248 determine dynamic condition route 298 from lane 232 through designated region 278 and back to lane 232. The central planner allocates space to robot 248 to take dynamic condition route 298, where the allocated space includes portions of lane 232 and designated region 278.

After allocating this space, the central planner directs robot 248 to perform a travel behavior taking dynamic condition route 298 around obstacle 280. After receiving the travel behavior, robot 248 takes dynamic condition route 298 around obstacle 280 and reports completion of the travel behavior to the central planner. Upon receiving the report of the completion of the travel behavior by robot 248, the central planner: (i) deallocates space for dynamic condition route 298 from robot 248, (ii) instructs robot 248 to take a travel behavior to continue on lane 232 as part of robot 248's mission, (iii) reallocates the space for dynamic condition route 298 to robot 240 that has just traveled through intersection 238 before robot 242, (iv) sends a message to robot 240 to perform a travel behavior to take dynamic condition route 298 around obstacle 280, (v) allocates space on lane 232 between intersection 238 and obstacle 280 to robot 242, and (vi) sends a message to robot 242 to perform a waiting behavior on lane 232 just behind obstacle 280 after reaching lane 232. After the central planner sends the message to robot 242 to perform a waiting behavior on lane 232 just behind obstacle 280, scenario 200 can be completed.

In other related scenarios, robots 240, 242, 244, 246, 248 take some or all of respective dynamic condition routes 290, 288, 284, 294, 298 at or about the same time; i.e., the central planner adjusts to some or all of dynamic conditions 282, 286, 292, 296 simultaneously or approximately simultaneously.

In even other related scenarios, some or all of robots 240, 242, 244, 246, 248 can store some or all of dynamic condition routes 284, 288, 290, 294, 298; e.g., as part of a copy of roadmap 210 stored by a robot. In these related scenarios, the central planner can direct a robot to take a dynamic condition route by instructing the robot to perform a "change route" behavior to change from a previous route to a new route; e.g., the dynamic condition route, perhaps after changing a pose and/or a location of the robot. For example, a roadmap can store a number of different routes through an intersection and adjacent designated regions, including dynamic condition routes 288, 290 and 294. Then, depending on a dynamic condition of the intersection and a robot; e.g., whether a designated region is an unoccupied region or an occupied region, the central planner and/or the motion planner of the robot can select one of the different routes as a dynamic condition route to traverse a specific intersection; e.g., intersection 238.

In further scenarios, dynamic condition routes 288 and 290 can be treated as conditional sub-routes of one dynamic conditional route where dynamic condition route 288 is a conditional sub-route selected when a dyna type of a robot indicates a robot is a relatively-large robot (e.g., robot 242) and where dynamic condition route 290 is a conditional sub-route selected when a type of a robot indicates a robot is a relatively-small robot (e.g., robot 240). Dynamic conditional routes with conditional sub-routes are discussed in more detail herein at least in the context of scenario 800 and FIGS. 8-10.

Figure 3:
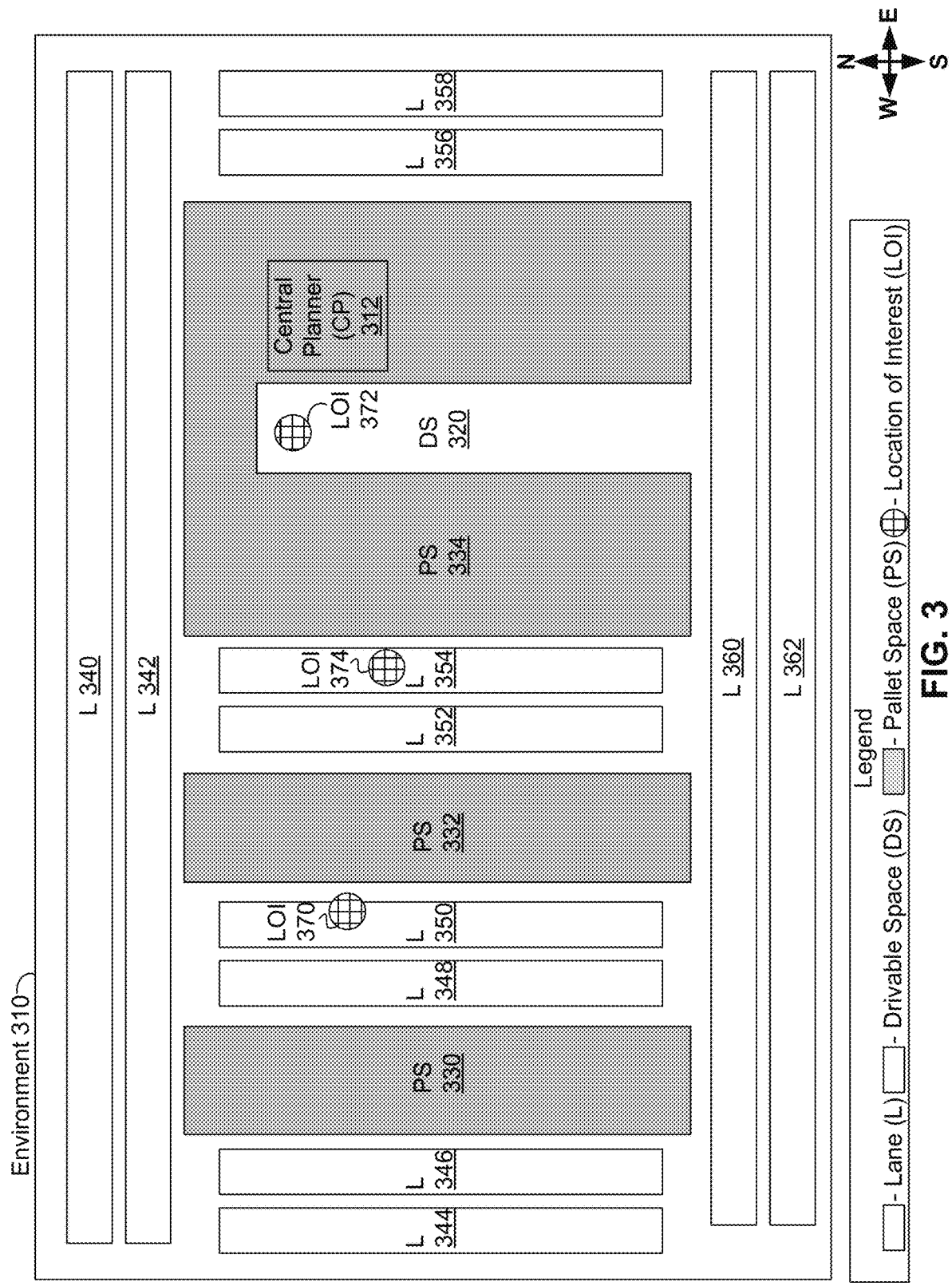
FIG. 3 is a diagram of an environment, in accordance with at least some example embodiments.

FIG. 3 is a diagram of environment 310, in accordance with at least some example embodiments. Environment 310 can be an indoor environment; e.g., a warehouse or similar facility. Environment 310 includes central planner 312 and drivable space 320. Central planner 312 can be one or more computing devices configured with hardware and/or software to perform at least part of the herein-described functionality of a central planner; e.g., to perform route planning, behavior assignment, mission assignment, and/or mission sequencing for one or more robots in environment 310. For example, central planner 312 can direct robot behaviors in a rectangular region of drivable space (DS) 320, where drivable space 320 is shown in FIG. 3 as a relatively-large light grey rectangle. FIG. 3 shows that central planner 312 is resident within environment 310; in other examples, central planner 312 is not resident within environment 310; e.g., central planner 312 can include one or more networked or "cloud" computing devices configured to communicate with robots and perhaps additional devices within environment 310.

Drivable space 320 includes three pallet spaces (PSs) 330, 332, 334 for storing pallets and lanes 340, 342, 344, 346, 348, 350, 352, 354, 356, 358, 360, 362 for maneuvering around and between pallet spaces 330, 332, 334, where a pallet space can include one or more pallet locations. As depicted in FIG. 3, each pair of vertically-oriented lanes; e.g., lanes 344 and 346, includes a left lane, e.g., lane 344, where robotic traffic is directed in a north-to-south or downward direction and a right lane; e.g., lane 346, where robotic traffic is directed in a south-to-north or upward direction. As also depicted in FIG. 3, each pair of horizontally-oriented lanes; e.g., lanes 340 and 342, includes an upper lane, e.g., lane 340, where robotic traffic is directed in an east-to-west or leftward direction and a lower lane; e.g., lane 342, where robotic traffic is directed in a west-to-east or rightward direction.

Environment 310 also includes three locations of interest (LOIs) 370, 372, 374, where location of interest 370 is located mainly on an upper portion of lane 350 and also located on adjacent drivable space 320. Location of interest 372 is located in an upper portion of a region of drivable space 320 within pallet space 334. Location of interest 374 is located just above a center portion of lane 354. In other example environments, more, fewer, and/or different lanes, pallet spaces, and locations of interest are possible as well.

Figure 4:
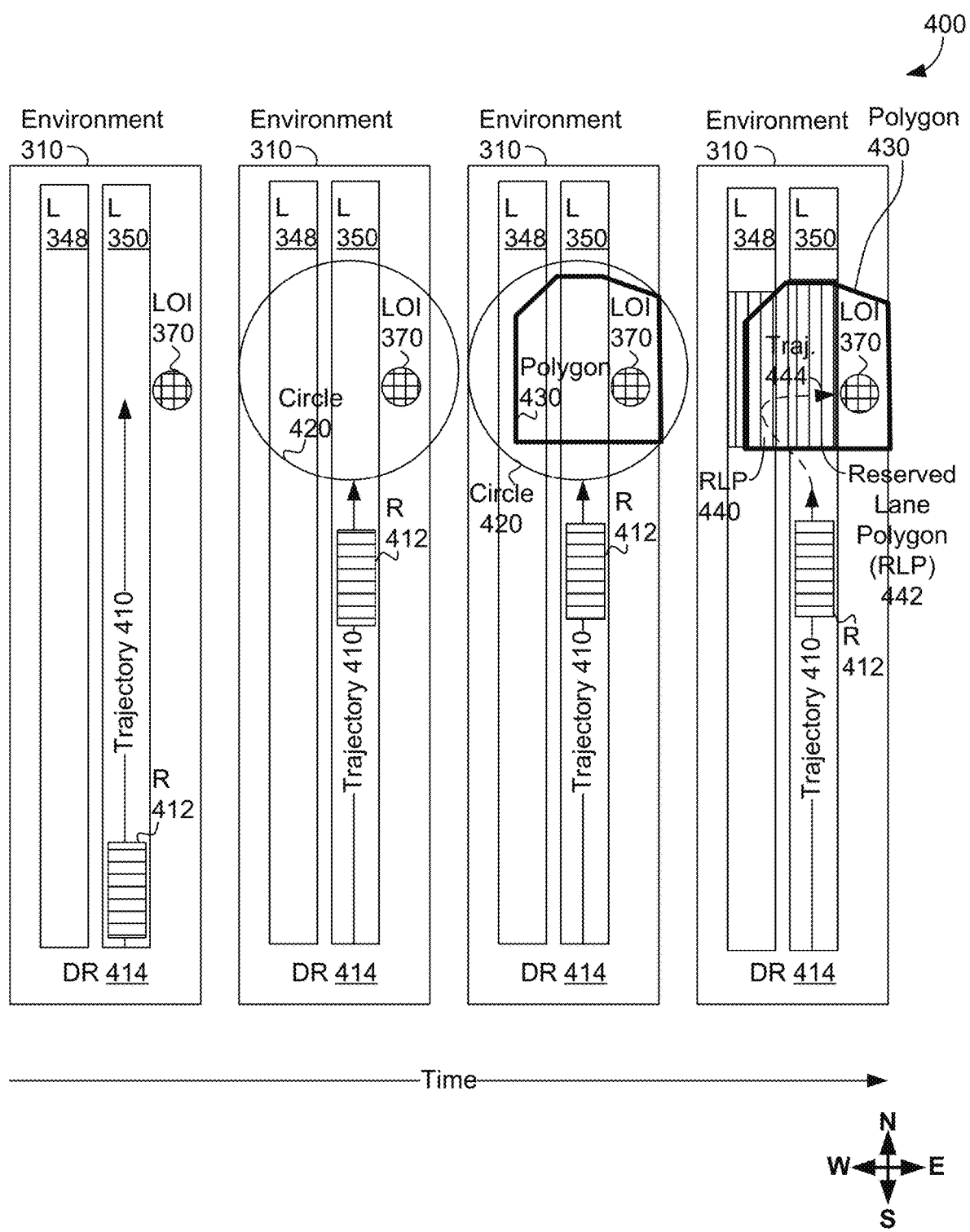
FIG. 4 shows a scenario of a robot moving to a location of interest in the environment of FIG. 3, in accordance with at least some example embodiments.

FIG. 4 shows scenario 400 of robot 412 moving to location of interest 370 in environment 310, in accordance with at least some example embodiments. As shown at far left of FIG. 4, scenario 400 begins with central planner 312 having assigned robot 412 to perform a travel behavior along trajectory 410 northward on lane 350 toward location of interest 370; e.g., a pick location, a place location. In scenario 400, location of interest 370 is a pick location for robot 412 to pick up a pallet. FIG. 4 shows that lane polygons for lanes 348 and 350 are surrounded by designated region 414.

Scenario 400 continues with robot 412 traveling along trajectory 410 to reach a position approximately midway along lane 350, as shown at center left of FIG. 4. Then, central planner 312 determines circle 420 as a region of space within designated region 414 for robot 412 with enough space for robot 412 to maneuver from lane 350 to location of interest 370. After determining circle 420, central planner 312 sends a request message to a motion planner of robot 412 to determine a trajectory to take robot 412 from lane 350 to location of interest 370, where the trajectory (a) keeps robot 412 within circle 420 and (b) puts robot 412 in a pose to pick up the pallet at location of interest 370.

As shown at center right of FIG. 4, in response to the request message from central planner 312, the motion planner of robot 412 determines an actual region of space, shown as polygon 430, and a time estimate to move robot 412 from lane 350 to location of interest 370 in a pose to pick up the pallet. FIG. 4 indicates that polygon 430 is within circle 420, thereby keeping robot 412 within circle 420 while maneuvering to location of interest 370. Polygon 430 also includes portions of lanes 348 and 350 and adjacent portions of designated region 414. After determining polygon 430, the motion planner of robot 412 sends a response message to central planner 312 that includes a description of polygon 430 and the related time estimate.

As shown at far right of FIG. 4, scenario 400 proceeds with central planner 312 receiving the response message. Central planner 312 then determines that the time estimate provided by the motion planner of robot 412 is a feasible estimate, and proceeds to allocate the space of polygon 430 to robot 412. In particular, central planner 312 allocates reserved lane polygon (RLP) 440 of lane 348, reserved lane polygon 442 of lane 350, and adjacent portions of designated region 414 to robot 412. In scenario 400, central planner 312 is able to allocate space of polygon 430 to robot 412 immediately; i.e. portions of lane polygons and designated regions can be allocated and deallocated by central planner 312. In other scenarios, central planner 312 has to wait for other robots before allocating all of the space of polygon 430 to robot 412; in some of these other scenarios, central planner 312 instructs robot 412 to wait on lane 350 until all of the space of polygon 430 is allocated to robot 412.

After allocating reserved lane polygons 440, 442 to robot 412, central planner 312 sends robot 412 an instruction message that includes an instruction to perform a travel behavior to travel on trajectory 444 toward location of interest 370 and to perform a pick behavior to pick up a pallet at location of interest 370. In scenario 400, trajectory 444 is determined by central planner 312. In some other scenarios, the motion planner of robot 412 determines trajectory 444, while in even other scenarios, central planner 312 and the motion planner of robot 412 cooperatively determine trajectory 444.

After receiving the instruction message, robot 412 carries out the travel behavior to take trajectory 444 to location of interest 370. Upon reaching location of interest 370, robot 412 carries out the pick behavior to pick up the pallet resting at location of interest 370. Upon completion of the pick behavior, scenario 400 can be completed.

In other scenarios, central planner 312 and/or the motion planner of robot 412 also determine a second trajectory to maneuver robot 412 from location of interest 370 back onto lane 350 to proceed with robot 412's mission at or about the same time that trajectory 444 is determined. Then, central planner 312 can add a second travel behavior to the instruction message mentioned above to instruct to robot 412 to take the second trajectory from location of interest 370 back onto lane 350 after performing the pick behavior. In some of these other scenarios, central planner 312 can deallocate some or all of the space within polygon 430; e.g., reserved lane polygon 440, once robot 412 completes the travel behavior to take the second trajectory onto lane 350. Further, central planner 312 may also direct robot 412 to perform another travel behavior to travel north on lane 350 once the travel behavior to take the second trajectory has been completed.

In still other scenarios, trajectory 444 puts robot 412 in a pose where robot 412 is unable to perform the pick behavior at location of interest 370; e.g., robot 412 is not aligned properly with the pallet at location of interest 370 to pick up the pallet at a pallet drop-off location of a pallet location at location of interest 370. Then, central planner 312 can either provide robot 412 with a move behavior to adjust a pose of robot 412 so that robot 412 is able to perform the pick behavior at location of interest 370. In other examples, such as where robot 412 is too large to maneuver, or the pallet at location of interest 370 is out of position, too large, and/or heavy for robot 412, after completion of trajectory 444, robot 412 is unable to perform the pick behavior at location of interest 370 and adjusting the pose of robot 412 is ineffective, then central planner 312 can direct another robot to perform a pick behavior at location of interest 370 via trajectory 444 or another related trajectory, that put the other robot in a pose so that the other robot can complete the pick behavior at location of interest 370.

Figure 5:
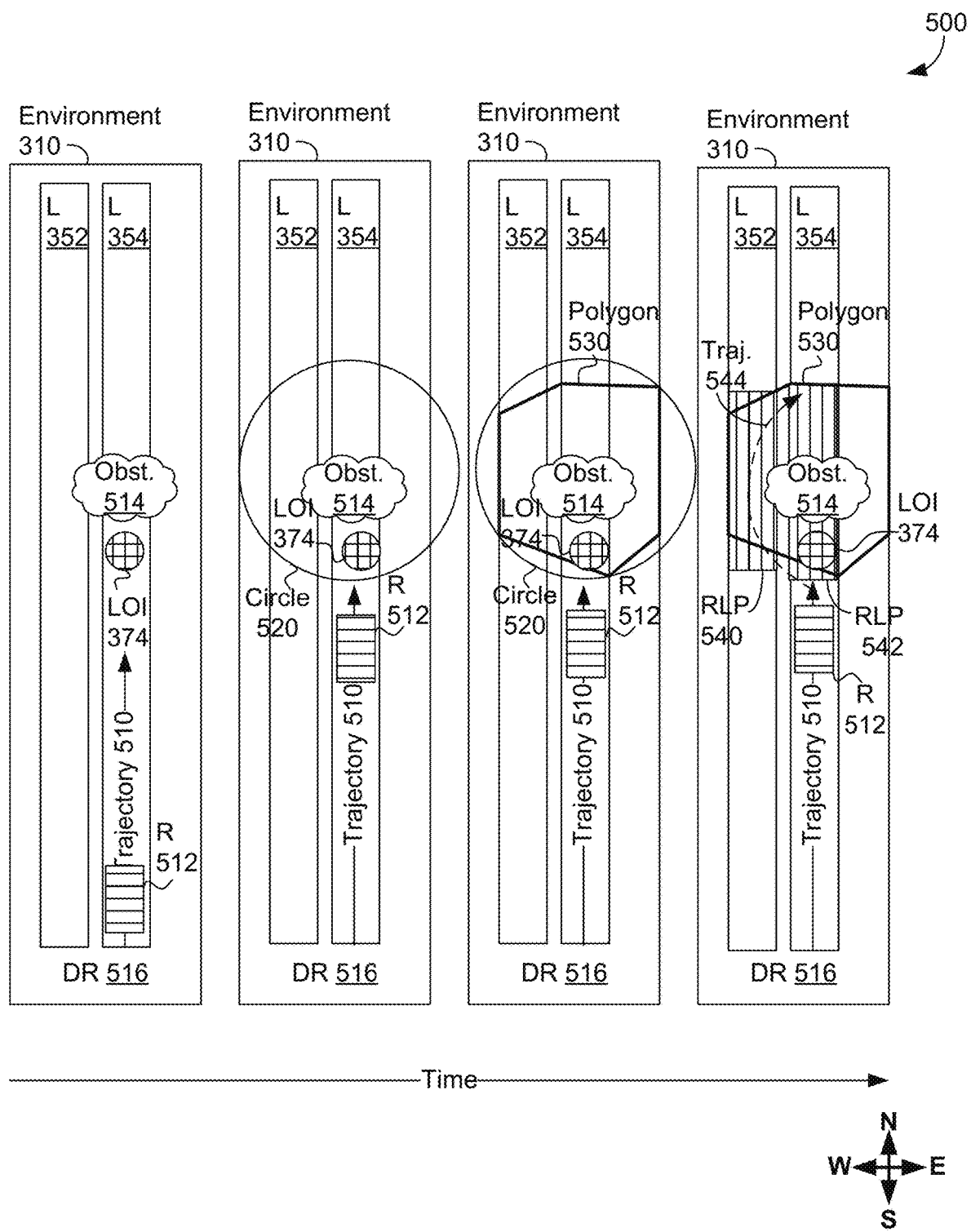
FIG. 5 shows a scenario of a robot passing an obstacle in the environment of FIG. 3, in accordance with at least some example embodiments.

FIG. 5 shows scenario 500 of robot 512 passing obstacle 514 in environment 310, in accordance with at least some example embodiments. As shown at far left of FIG. 5, scenario 500 begins with central planner 312 having assigned robot 512 to perform a travel behavior along trajectory 510 northward on lane 354 toward location of interest 374. In scenario 500, location of interest 374 is a location where a robot previously stopped to avoid contact with obstacle 514 that completely blocks lane 354 and a portion of designated region 516 right (east) of lane 354. Obstacle 514 also partially blocks adjacent lane 352 to the left (west) of lane 354. FIG. 5 shows that lane polygons for lanes 352 and 354 are surrounded by designated region 516.

Scenario 500 continues with robot 512 traveling along trajectory 510 to reach a position just south of location of interest 374, as shown at center left of FIG. 5 Then, central planner 312 determines circle 520 as a region of space for robot 512 with enough space for robot 512 to maneuver around obstacle 514.

After determining circle 520, central planner 312 sends a request message to a motion planner of robot 512 to determine a trajectory around obstacle 514, where the trajectory (a) keeps robot 512 within circle 520 and (b) puts robot 512 back on lane 354 after moving around and past obstacle 514. In scenario 500, the request message includes a pass behavior, which has a starting pose for robot 512 oriented northward on lane 354 just south of location of interest 374, an ending pose oriented northward on lane 354 north of obstacle 514, and circle 520 acting a bounding region of space for performing the pass behavior. In other scenarios, a pass behavior can have more, less, and/or different information.

As shown at center right of FIG. 5, in response to the request message from central planner 312, the motion planner of robot 512 determines an actual region of space, shown as polygon 530, and a time estimate to perform the pass behavior. As shown in FIG. 5, polygon 530 is within circle 520, thereby keeping robot 512 within circle 520 while maneuvering to location of interest 374. Polygon 530 also includes portions of lanes 352 and 354 and adjacent regions of designated region 516. After determining polygon 530, the motion planner of robot 512 sends a response message to central planner 312 that includes a description of polygon 530 and the related time estimate.

As shown at far right of FIG. 5, scenario 500 proceeds with central planner 312 receiving the response message. Central planner 312 then determines that the time estimate provided by the motion planner of robot 512 is a feasible estimate, and proceeds to allocate the space of polygon 530 to robot 512. In particular, central planner 312 allocates reserved lane polygon 540 of lane 352, reserved lane polygon 542 of lane 354, and adjacent portions of designated region 516 to robot 512. In scenario 500, central planner 312 is able to allocate space of polygon 530 to robot 512 immediately. In other scenarios, central planner 312 has to wait for other robots before allocating all of the space of polygon 530 to robot 512; in some of these other scenarios, central planner 312 instructs robot 512 to wait on lane 354 until all of the space of polygon 530 is allocated to robot 512.

After allocating reserved lane polygons 540, 542 to robot 512, central planner 312 sends robot 512 an instruction message that includes an instruction to perform the previously-sent pass behavior. In scenario 500, trajectory 544 is determined by the motion planner of robot 512 based on sensory data obtained about obstacle 514. In some other scenarios, central planner 312 determines trajectory 544; e.g., based on one or more trajectories determined by other robots passing obstacle 514. In even other scenarios, central planner 312 and the motion planner of robot 512 cooperatively determine trajectory 544.

After receiving the instruction message, robot 512 carries out the pass behavior and takes trajectory 544 to pass obstacle 514 via a lane portion of lane 352 and subsequently returning to lane 354 and reaching the ending pose provided by central planner 312 in the pass behavior. Upon reaching the ending pose, robot 512 sends a message to central planner 312 indicating that the pass behavior has been completed. After receiving the message indicating that the pass behavior has been completed, central planner 312 sends a wait behavior instructing robot 512 to wait at the ending pose, deallocates space of polygon 530 allocated to robot 512, and allocates space on lane 354 north of obstacle 514 to robot 512. After allocating space to robot 512 on lane 354, central planner 312 sends a travel behavior to robot 512 to continue traveling north on lane 354. After the travel behavior is sent, scenario 500 can be completed. In other scenarios, a similar procedure to that described for scenario 500 can be used to pass moving obstacles; e.g., slower moving vehicles, robots, humans, etc.

Figure 6:
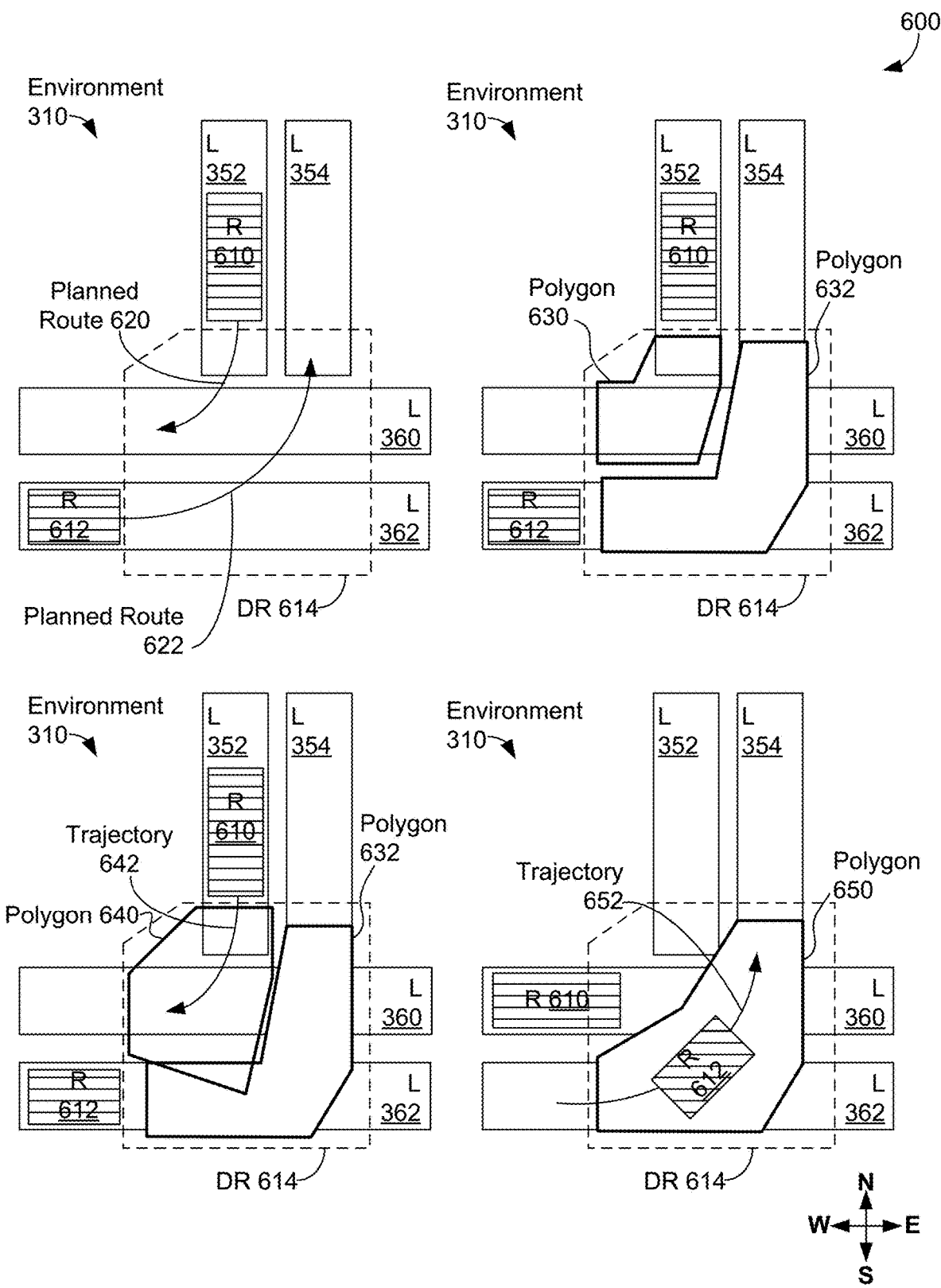
FIG. 6 shows a scenario of two robots passing through an intersection of the environment of FIG. 3, in accordance with at least some example embodiments.

FIG. 6 shows scenario 600 of two robots 610, 612 passing through an intersection of environment 310, in accordance with at least some example embodiments. As shown at upper left of FIG. 6, the intersection is a "T intersection" where one pair of vertically-oriented lanes 352 and 354 intersects but does not cross another pair of horizontally-oriented lanes 356 and 358. In scenario 600, designated region 614 bounds robotic travel in and around the intersection.

At an onset of scenario 600, robot 610 is on lane 352 waiting for space allocation to perform a travel behavior along planned route 620 to turn onto lane 360. Also, robot 612 is on lane 362 waiting for space allocation to perform a travel behavior along planned route 622 to turn onto lane 354. In other scenarios, pass behaviors are used instead of travel behaviors when traversing intersections.

As indicated at upper right of FIG. 6, scenario 600 proceeds with central planner 312 sending request messages to the motion planners of robots 610 and 612 to determine trajectories for traveling through the intersection of lane pair 352 and 354 and lane pair 360 and 362. In particular, central planner 312 sends a request message to the motion planner of robot 610 to determine a trajectory for robot 610 to travel from lane 352 to lane 360, where the trajectory (a) keeps robot 610 within polygon 630 and (b) puts robot 610 in a suitable pose to travel westbound on lane 360 after completing the trajectory. Central planner 312 also sends a request message to the motion planner of robot 612 to determine a trajectory for robot 612 to travel from lane 362 to lane 354, where the trajectory (a) keeps robot 612 within polygon 632 and (b) puts robot 612 in a suitable pose to travel northbound on lane 354 after completing the trajectory.

As indicated at lower left of FIG. 6, scenario 600 proceeds with the motion planner of robot 612 sending a response message determining an actual region of space, shown as polygon 632, and a time estimate TE_612a for robot 612 to perform the travel behavior from lane 362 to lane 354. However, the motion planner of robot 610 sending a response message determining an actual region of space, shown as polygon 640 and a time estimate to perform the travel behavior from lane 352 to lane 360. Note that polygon 640 both (a) is larger than polygon 630 and (b) intersects with polygon 632; as such, the response message sent by the motion planner of robot 610 can be considered as a rejection of the travel behavior requested by central planner for robot 610. In scenario 600, the motion planner of robot 610 determines that polygon 630 is infeasible for robot 610 to travel along planned route 620 as being too tight of a corner for relatively-large robot 610. Thus, the motion planner of robot 610 determines a different polygon; e.g., polygon 640 as a feasible space for robot 610 to travel from lane 352 to lane 360. In some examples, the response message sent to central planner 312 can include a feasibility bit or other indicator that can be set to TRUE (or an equivalent value) to indicate that a motion planner finds a behavior requested by central planner 312 to be feasible, or can otherwise be set to FALSE (or an equivalent value); i.e., indicating that the motion planner finds a requested behavior to be infeasible.

In response to these response messages from the motion planners of robots 610 and 612, central planner 312 reserves space on lanes 352, 360, and 362 and adjacent drivable space covered by polygon 640 for use by robot 610 and sends a travel behavior to robot 610 to take trajectory 642 from lane 352 to lane 360, and a waiting behavior to wait on lane 360 for space allocation on lane 360 for further travel. After receiving the travel behavior, robot 610 travels along trajectory 642 from lane 352 to lane 360, sends a message indicating the completion of the travel behavior to central planner 312, and waits at a pose on lane 360 shown at lower right of FIG. 6. Upon reception of the message indicating the completion of the travel behavior of robot 610, central planner 312 deallocates space of polygon 640 no longer used by robot 610 from robot 610; e.g., central planner 312 maintains allocation of space on lane 360 for robot 610 to wait.

Scenario 600 continues with central planner 312 sending a request message to the motion planner of robot 612 to determine a trajectory for robot 612 to travel from lane 362 to lane 354, where the trajectory (a) keeps robot 612 within polygon 650 and (b) puts robot 612 in a suitable pose to travel northbound on lane 354 after completing the trajectory. In response to this request message, the motion planner of robot 612 sends a response message to central planner 312, with an indication an actual region of space corresponding to polygon 650 and a time estimate TE_612b to perform the travel behavior from lane 352 to lane 360, where the time estimate TE_612b is less than the time estimate TE_612a previously provided from robot 612 to central planner 312.

In response to the response message from the motion planner of robot 612, central planner 312 reserves space on lanes 354, 360, and 362 and adjacent drivable space covered by polygon 650 for use by robot 612 and sends a travel behavior to robot 612 to take trajectory 652 from lane 362 to lane 354, and a waiting behavior to wait on lane 354 for space allocation on lane 354 for further travel. After receiving the travel behavior, robot 610 travels along trajectory 652 from lane 362 to lane 354 as shown at lower right of FIG. 6. After completing trajectory 652, robot 610 reaches lane 354, sends a message indicating the completion of the travel behavior to central planner 312, and waits on lane 354.

Upon reception of the message indicating the completion of the travel behavior, central planner 312 can deallocate space of polygon 650 from robot 612. After deallocating space of polygon 650 from robot 612, scenario 600 is completed.

Figure 7:
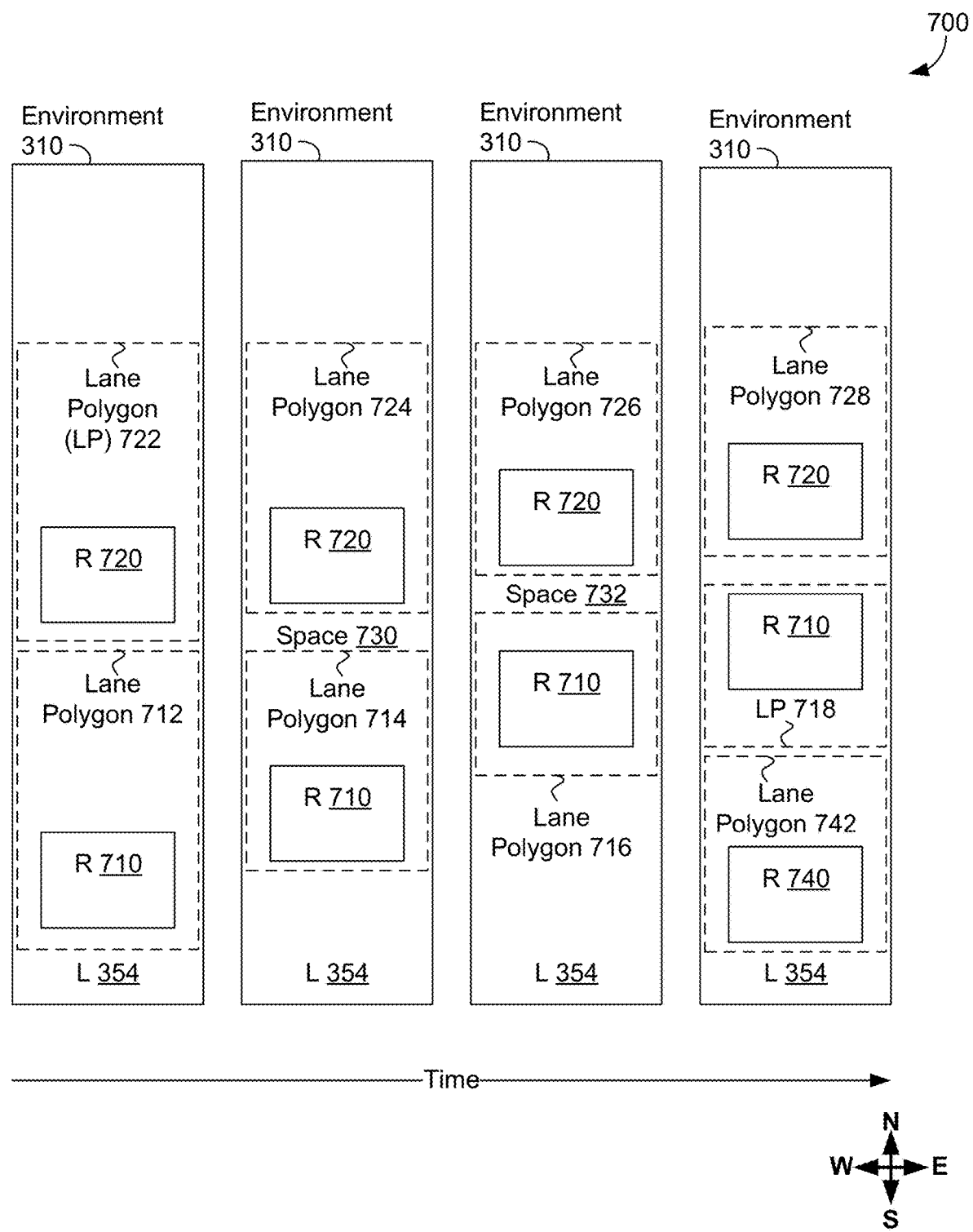
FIG. 7 shows a scenario involving allocation of a lane between two robots in the environment of FIG. 3, in accordance with at least some example embodiments.

FIG. 7 shows scenario 700 involving allocation of lane 354 between robots 710 and 720 in environment 310, in accordance with at least some example embodiments. In particular, scenario 700 involves allocation of a portion of lane 354 north of lane 360 and south of location of interest 374.

As shown at far left of FIG. 7, scenario 700 begins with central planner 312 having reserved a first portion of lane 354, shown as lane polygon 712, for use by robot 710, and a second portion of lane 354, shown as lane polygon 722, for use by robot 720. During scenario 700, both robots 710 and 720 are in the process of carrying out respective travel behaviors to move north along lane 354 and both robots 710 and 720 periodically report their respective locations to central planner 312. In scenario 700, lane polygons reserved for robots 710 and 720 are rectangles—in other scenarios, differently shaped lane polygons can be used and/or non-polygonal shapes, such as circles or ellipses, can be reserved for robots.

Scenario 700 continues with both robots 710 and 720 traveling north within respective lane polygons 712 and 722 of lane 354, as shown at center left of FIG. 7. After receiving location reports from each of robots 710 and 720, central planner 312 adjusts respective lane polygons 712 and 722 to account for the reported locations while maintaining space between the lane polygons so that the lane polygons do not overlap.

In particular, central planner 312 adjusts lane polygon 712 for robot 710 to become lane polygon 714. As robot 710 has not yet reached a northern portion of lane polygon 712, lane polygon 714 has a same northern boundary as lane polygon 712. However, a southern boundary of lane polygon 714 has moved north as robot 710 has moved north. Central planner 312 also adjusts lane polygon 722 for robot 720 to become lane polygon 724. As robot 720 has not yet reached a northern portion of lane polygon 722, lane polygon 724 has a same northern boundary as lane polygon 722. However, a southern boundary of lane polygon 724 has moved north as robot 710 has moved north, leaving space 730 between lane polygons 714 and 724.

In scenario 700, lane 354 is unidirectional. As lane 354 is unidirectional; i.e., only has traffic moving from south to north, robots 710 and 720 cannot back up on lane 354. Thus, central planner 312 can update lane polygon 714 for robot 710 to take up part or all of space 730 that was allocated to robot 720 but is unallocated at this point in scenario 700. However, central planner 312 but should not reduce a lane polygon along the south-to-north direction of travel along lane 354; i.e., central planner 312 should not move a northern border of a lane polygon allocated to a robot to the south. In some cases, reducing a lane polygon along a lane's direction of travel can cause a robot to move outside of its allocated lane polygon; e.g., if the robot had already moved up to the previous northern border of a lane polygon for lane 354.

Scenario 700 continues with central planner 312 receiving further location updates from robots 710 and 712 and adjusting their respective lane polygons accordingly. As shown at center right of FIG. 7, both robots 710 and 720 have continued to move northward, with robot 710 moving northward faster than robot 720. To accommodate robot 710, central planner 312 has adjusted lane polygon 714 to become lane polygon 716, where space 730 has been incorporated into lane polygon 716; thus, space 730 has been reallocated from robot 720 to robot 710 during scenario 700. Also, a southern border of lane polygon 714 has been moved northward to form a southern border of lane polygon 716, as robot 710 has moved northward and so no longer needs the now-deallocated space. Central planner 312 also has adjusted lane polygon 724 to become lane polygon 726, by moving a southern border of lane polygon 724 northward as robot 720 has moved northward, thereby creating unallocated space 732 between lane polygon 716 and lane polygon 726.

Scenario 700 continues with central planner 312 receiving further location updates from robots 710 and 720 and adjusting their respective lane polygons accordingly. As shown at far right of FIG. 7, both robots 710 and 720 have continued to move northward, with robot 710 continuing to moving northward faster than robot 720. To accommodate robot 710, central planner 312 has adjusted lane polygon 716 to become lane polygon 718, where most of space 732 has been incorporated into lane polygon 718; thus, most of space 732 has been reallocated from robot 720 to robot 710 during scenario 700. Also, a southern border of lane polygon 716 has been moved northward to form a southern border of lane polygon 716, as robot 710 has moved northward and so no longer needs the now-deallocated space. Central planner 312 also has adjusted lane polygon 726 to become lane polygon 728, by moving both northern and southern borders of lane polygon 726 a small amount northward, as robot 720 has moved a small amount northward. In addition, central planner 312 has allocated lane polygon 742 behind/southward of lane polygon 718 for use by robot 740, thereby enabling robot 740 to also use lane 354. By use of lane polygons that are adjusted due to travel of robots, central planner 312 can plan for and subdivide a lane for use by multiple robots simultaneously without collisions between the robots on the lane. After robot 740 moves onto lane 354 and into lane polygon 742 as shown in FIG. 7, scenario 700 can be completed.

Figure 8:
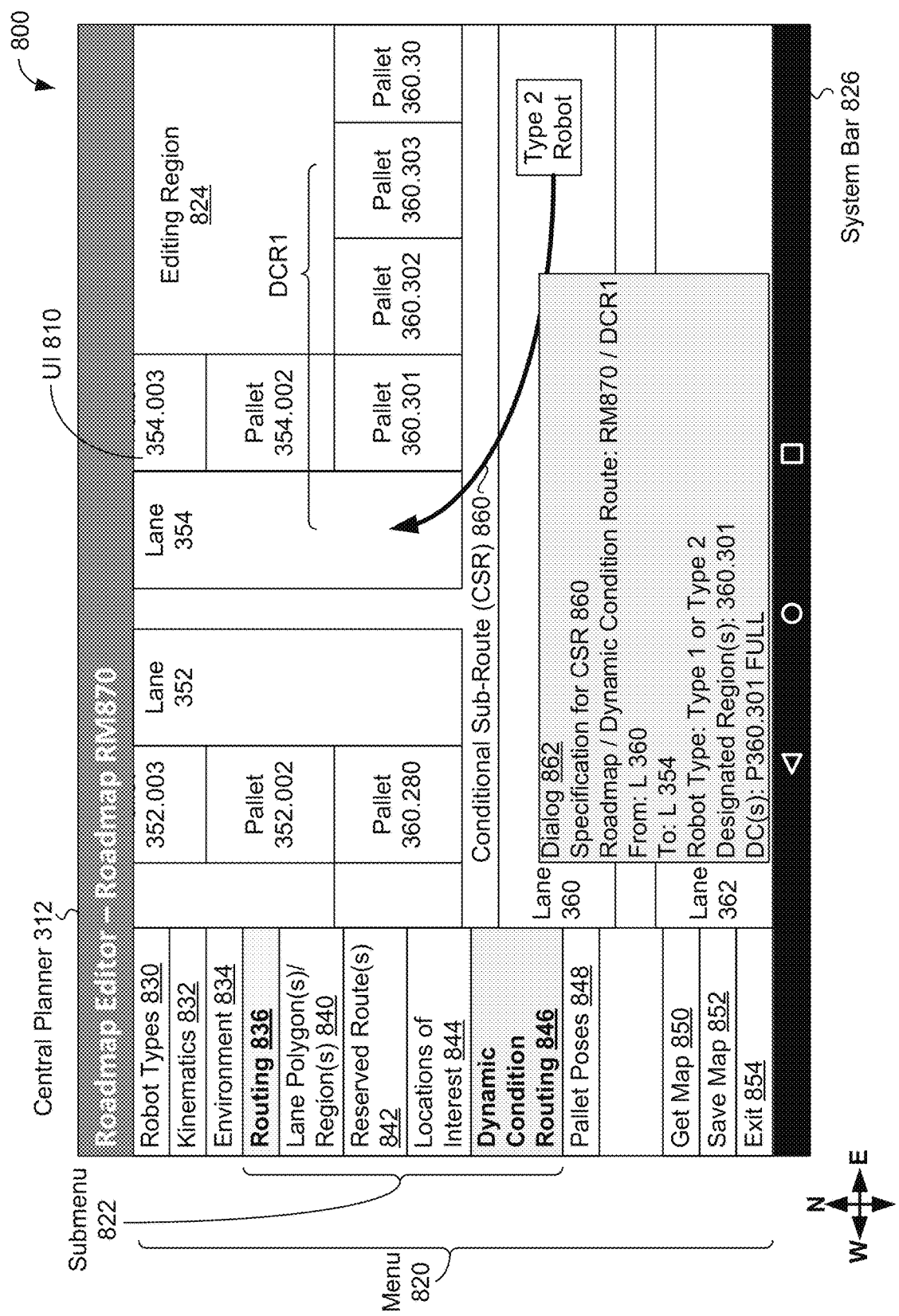
FIG. 8 shows a user interface utilized during a scenario, in accordance with at least some example embodiments.
Figure 9:
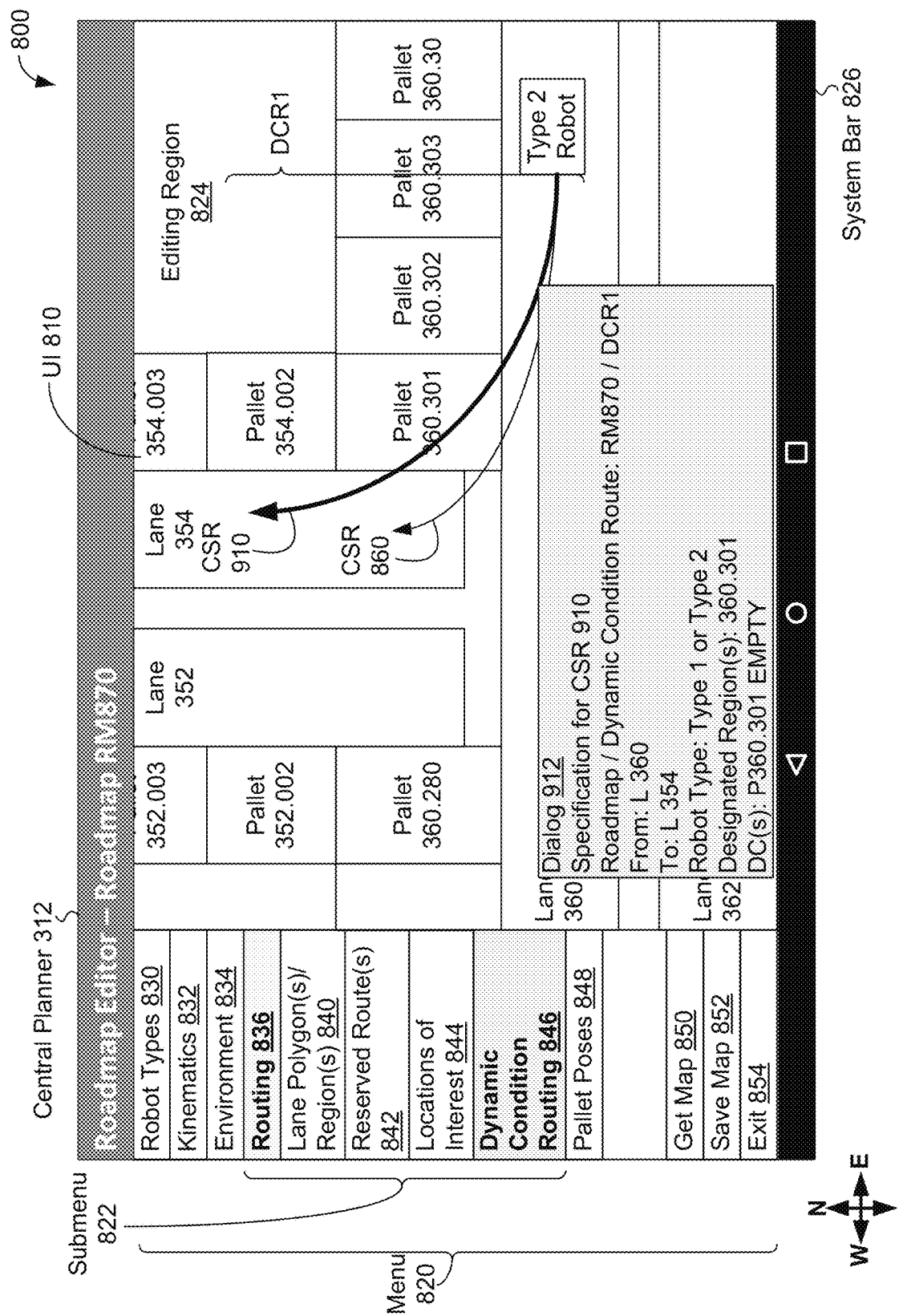
FIG. 9 shows a user interface utilized during the scenario of FIG. 8, in accordance with at least some example embodiments.

FIGS. 8 and 9 both show user interface 810 of central planner 312 utilized during scenario 800, in accordance with at least some example embodiments. Scenario 800 begins with user interface 810 entitled "Roadmap Editor" of central planner 312 used to develop a roadmap of environment 310 named roadmap "RM870" as shown in a title bar of user interface 810. In particular, scenario 800 involves using user interface 810 to provide conditional routing information of roadmap RM870 for at least one dynamic condition route named "DCR1".

In scenario 800, dynamic condition route DCR1 includes one or more conditional sub-routes (CSRs) and related dynamic conditions, where a specific conditional sub-route of the dynamic condition route DCR1 is selected when dynamic condition(s) associated with the conditional sub-route are met. In particular, user interface 810 is used during scenario 800 to specify information for two conditional sub-routes 860, 910 of dynamic condition route DCR1 in roadmap RM870, where dynamic condition route DCR1 is usable for traveling from lane 360 to lane 354. One of conditional sub-routes 860, 910 of dynamic condition route DCR1 can be selected based on a dynamic condition named "P360.301" having a respective status of "EMPTY" or "FULL", where dynamic condition P360.301 refers to a pallet location 360.301 that may be occupied/full or unoccupied/empty. In other scenarios, dynamic condition P360.301 can have additional statuses; e.g., PARTIALLY FULL, when pallet location 360.301 has one or more objects taking up some but not all of an area of pallet location 360.301, OBSTRUCTED, when pallet location 360.301 has one or more objects blocking access to the pallet location, PARTIALLY OBSTRUCTED, etc.

Scenario 800 continues with central planner 312 distributing roadmap RM870 to three robots 1010, 1012, 1014. Scenario 800 continues with central planner 312 initializing dynamic condition P360.301 to FULL, indicating that pallet location 360.301 is full; e.g., contains a pallet, and directs robot 1010 to perform a travel behavior from lane 360 to lane 354 using conditional sub-route 860 associated with dynamic condition P360.301 being FULL.

In scenario 800, central planner 312 obtains data related to dynamic conditions of a dynamic condition route from robots 1010, 1012, 1014, receives the requested data from the robot(s), uses the received data to evaluate dynamic conditions of dynamic condition route DCR1, selects a specific conditional sub-route 860, 910 of the dynamic condition route DCR1, and provide a travel behavior with the selected specific conditional sub-route to a robot; i.e., central planner 312 chooses a one of conditional sub-routes 860, 910 to be taken during a missions of scenario 800. In other scenarios, central planner 312 provides a travel behavior with a dynamic condition route to a robot and allow the robot to choose a specific conditional sub-route of the conventional route based on which dynamic conditions, if any, of the dynamic condition route are met; i.e., a robot can choose a specific conditional sub-route of the dynamic condition route during a mission. For example, if a dynamic condition route includes conditional sub-routes with conditions that are based on a type of a robot, then providing the dynamic condition route and allowing the robot to choose a specific conditional sub-route can effectively provide the robot with a sub-route specific to the type of the robot. As a central planner presumably knows the type of each robot in an environment, the central planner can allocate designated region and/or lanes to the robot for conditional sub-route prior to sending the travel behavior with a dynamic condition route, thereby ensuring that space has been allocated for the sub-route that the robot will choose. Other use cases are possible as well; e.g., specific sub-route selections of a dynamic condition route that are made by both central planner 312 and a robot.

Scenario 800 continues with robot 1010 sensing pallet location 360.301 and determining that the pallet location is an unoccupied region and so sends sensory information indicating that pallet location 360.301 is empty to central planner 312; i.e., pallet location 360.301 is an unoccupied region. Upon reception of the sensory information from robot 1010, central planner 312 updates dynamic condition P360.301 to be EMPTY and directs robot 1010 to perform a travel behavior from lane 360 to lane 354 using conditional sub-route 910 associated with dynamic condition P360.301 being EMPTY. Robot 1010 then takes conditional sub-route 910 to travel from lane 360 to lane 354. Central planner 312 then directs robot 1012 to perform a travel behavior from lane 360 to lane 354 using conditional sub-route 910 associated with dynamic condition P360.301 being EMPTY. Robot 1012 confirms that pallet location 360.301 is indeed empty, informs central planner 312 of a current status of pallet location 360.301 being empty, and proceeds to take conditional sub-route 910 from lane 360 to lane 354.

Central planner 312 also directs robot 1014 to perform a travel behavior from lane 360 to lane 354 using conditional sub-route 910 associated with dynamic condition P360.301 being EMPTY. Robot 1014 senses pallet location 360.301 and determines that the pallet location is full; i.e., pallet location 360.301 is an occupied region, and so informs central planner 312. Upon reception of the sensory information from robot 1014, central planner 312 updates dynamic condition P360.301 to be FULL and directs robot 1014 to perform a travel behavior from lane 360 to lane 354 using conditional sub-route 860 associated with dynamic condition P360.301 being FULL. Robot 1014 then takes conditional sub-route 860 to travel from lane 360 to lane 354, and scenario 800 can be completed thereafter.

FIG. 8 shows user interface (UI) 810 of central planner 312, where user interface 810 includes menu 820, editing region 824, and system bar 826. User interface 810 can be used to edit roadmaps, such as, but not limited to, a roadmap of an indoor environment; e.g., environment 310. Menu 820 lists a number of selections related to a roadmap, such as roadmap RM870 of at least part of environment 310, where roadmap RM870 is partially displayed in editing region 824. In other scenarios, user interface 810 is not directly associated with a central planner; i.e., a roadmap is generated using one system, such as a roadmap generating system that includes software for user interface 810, and then the generated roadmap is sent or otherwise provided from roadmap generating system to central planner 312 for use in directing robots of environment 310.

A selection of menu 820, when chosen, can cause user interface 810 to perform one or more operations related to the chosen selection. Menu 820 includes robot type selection 830, kinematics selection 832, environment selection 834, routing selection 836, lane polygon(s)/region(s) selection 840, reserved route(s) selection 842, locations of interest selection 844, dynamic condition routing selection 846, pallet poses selection 848, get map selection 850, save map selection 852, and exit selection 854. In other embodiments than those shown in FIGS. 8 and 9, menu 820 can provide more, fewer, and/or different menu selections. In still other embodiments, other graphical elements, such as pull-down menus, icons, and/or dialogs can be used with and/or replace one or more selections of menu 820.

Robot type selection 830 can be used to specify, review, update, and/or delete an association between a classification or type of robot and the roadmap. As an example shown in FIG. 2, three types/classifications of robots could be used; e.g., robot 240 can have a type related to a relatively-small robot, robots 244, 246, 248 can each have a type related to a moderately-sized robot, and robot 242 can have a type related to a relatively-long robot. Other designations of types of robots than types based on size are possible as well.

Kinematics selection 832 can be used to specify, review, update, and/or delete one or more kinematic parameters related to motion or kinematics of a robot associated with part or all of the roadmap. Example kinematic parameters include, but are not limited to, parameters related to: maximum and/or minimum velocity or speed of a robot, maximum and/or minimum acceleration for the robot, maximum and/or minimum jerk (derivative of acceleration) for the robot, one or more masses of the robot, one or more weights of the robot, cargo capacity, and one or more coefficients of friction for the robot. In some embodiments, some or all of the kinematic parameters can be specified for a robot by specifying a type of the robot using robot type selection 830.

In other embodiments, kinematic parameters can be specified for a portion of the roadmap; e.g., one or more kinematic parameters specified for one or more particular intersections, edges, transition curves. In still other embodiments, other related parameters, such as, but not limited to, performance parameters/characteristics, different weights/masses, different parameters related to propulsion of the robot, and different parameters and/or actuators for movement, can be specified using kinematics selection 832. Many other example parameters are possible as well.

Environment selection 834 can be used to specify features, parameters, and/or other data related to an environment; e.g., drivable spaces, lanes, directions of lanes, pallet spaces, locations of interest, sizes and shapes of spaces, lanes, etc. in the environment. In some examples, selection of environment selection 834 can cause user interface 810 to provide submenu 822 of menu 820 and/or one or more other user interface controls to specify features, parameters, and/ or other data related to an environment and/or a roadmap shown in editing window 824.

Routing selection 836 can be used to specify features, parameters, and/or other data related to routing robotic and perhaps other travel within the environment. In FIG. 8, routing selection 836 is shown in bold to indicate that the selection has been selected for use at this stage of scenario 800. In response to selecting routing selection 836, user interface 810 displays submenu 822 with additional routing-related selections. In the example shown in FIG. 8, submenu 822 of routing-related selections includes lane polygon(s)/region(s) selection 840, reserved route(s) selection 842, locations of interest selection 844, dynamic condition routing selection 846, and pallet poses selection 848. In other scenarios, more, fewer, and/or different routing-related selections are possible as well.

Lane polygon(s)/region(s) selection 840 can be used to specify one or more lane polygons and/or lane regions that can be allocated to a robot. For example, when a robot first enters onto a lane, such as "Type 2 Robot" entering onto lane 354 after taking conditional sub-route 860, then the robot can be instructed to perform a waiting behavior unless central planner 312 can allocate an initial lane polygon on the entered-onto lane to the robot. In this example, a size and/or a shape of the initial lane polygon on lane 354 can be specified as part of lane polygon(s)/region(s) selection 840. An another example, before the Type 2 robot can begin a travel behavior to take conditional sub-route 860, a lane polygon on lane 360, a lane polygon on lane 354, and/or a region of drivable space between lane 360 and lane 354 traversed by conditional sub-route 860 can be allocated to the Type 2 Robot by central planner 312. Some or all of the shapes and/or sizes of these lane polygons and regions of drivable space related to conditional sub-route 860 to be allocated can be specified using lane polygon(s)/region(s) selection 840.

A lane region can be a portion of a lane polygon; e.g., reserved lane polygon 440 of lane 348 of scenario 400. In some cases, a lane region does not encompass an entire width of a lane; e.g., polygon 640 of scenario 600 includes a triangular lane region of lane 362 that does not encompass the entire width of lane 362. As a yet another example, when a robot moves along a lane, a lane region can move with the robot, such as lane polygons 712, 714, 716, 718 that move with robot 710 of scenario 700. Some or all of the sizes and/or shapes of lane regions allocated when a robot moves along a lane can be specified using lane polygon(s)/region(s) selection 840. Other example uses of lane polygon(s)/region(s) selection 840 are possible as well.

Reserved route(s) selection 842 can be used to specify one or more routes between two locations; e.g., a route through an intersection such as conditional sub-route 860, a route from a lane to a pick location or vice versa, a route from a lane to a place location or vice versa, a lane through a designated region adjacent or near to a lane, etc. The route can be specified for a particular robot; e.g., taking kinematics, turning radii, etc. of the particular route. That is, a route reserved for a relatively-small robot, such as robot 240, can differ from a route for a robot with different kinematics and/or other parameters than the relatively-small robot; e.g., a robot such as robot 242. In some cases, a reserved route can have a starting pose and/or an ending pose, where a starting pose of a reserved route can be a pose to be taken by the robot when starting (or just before starting) the reserved route, and an ending pose of the reserved route can be a pose to be taken by the robot when starting the reserved route when ending (or just after ending) the reserved route.

Locations of interest selection 844 can be used to specify one or more locations of interest, such as one or more of locations of interest 370, 372, 374. As well as the previously-described examples of locations of interest, other locations of interest can be specified as well; e.g., a location of a charging or fuel facility to recharge/refuel a robot, a location of a maintenance or repair facility for maintaining/repairing a robot, a location of a loading dock or other location where a number of pallets are likely to arrive and/or depart from the environment, etc.

Dynamic condition routing selection 846 can be used to specify data for a dynamic condition route. In the example shown in FIG. 8, dynamic condition routing selection 846 is selected, as indicated using bold font and a grey background for dynamic condition routing selection 846 in menu 820. Other indicia of selection can be used in other examples.

Pallet poses selection 848 can be used to specify one or more poses, locations, and/or orientations of pallets and/or locations for storing pallets. For example, at an upper center portion of editing region 824, a pallet location "354.002" that is near to lane 354 is specified. Pallet poses selection 848 can then be used to indicate a feasible (or infeasible) pose of a pallet in pallet location 354.002 for a robot to place a pallet in or to pick up a pallet at pallet location 354.002.

Get map selection 850 can be used to retrieve a roadmap from data storage and load the retrieved roadmap into user interface 810. Save map selection 852 can be used to store a roadmap currently loaded into user interface 810 to data storage. For example, a roadmap can be stored in non-volatile data storage as one or more files, where non-volatile data storage is discussed below in the context of data storage 1104 of FIG. 11A. Exit selection 854 can be used to terminate execution of user interface 810; e.g., exit an application providing user interface 810.

Editing region 824 can be used to create, review, and update roadmaps. For example, roadmaps can be updated by creating, reviewing, updating, and/or deleting lanes, pallet spaces, drivable spaces, etc. of a roadmap displayed in editing region 824. After creating, reviewing, and/or updating a roadmap, the roadmap can be saved to data storage for later use; e.g., using save map selection 852. In scenario 800, user interface 810 has loaded and displayed roadmap RM870, which is shown in part in editing region 824 of FIGS. 8 and 9. Roadmap RM870 includes depictions of lanes 352, 354, 360, and 362, and designated region locations assigned as pallet locations. The pallet locations include pallet locations "352.002" and "352.003" near lane 352, pallet locations "354.002" and "354.003" near lane 354, and pallet locations "360.280", "360.301", "360.302", "360.303" near lane 360. In particular, pallet location 360.301 is near a corner formed by lanes 354 and 360. Other example information, pallet locations, lanes, and/or other information can be specified for a roadmap; e.g., roadmap RM870, using user interface 810.

System bar 826 shows a triangle, circle, and square, which can be used to return to a previous application executed prior to user interface 810 by selecting the triangle, return to a home screen by selecting the circle, and provide a listing of all executed applications by selecting the square. Graphical elements, such as a selection of menu 820, edges, intersections, transition curves, curve segments, and junction points of roadmaps shown in editing region 824, and the triangle, circle, and square of system bar 826, can be selected using a user input device of central planner 312. Example user input devices are described below in the context of user interface module 1101 shown in FIG. 11A.

Scenario 800 includes a user utilizing user interface 810 to specify two conditional sub-routes 860, 910 of a dynamic condition route DCR1 that is part of roadmap RM870, where conditional sub-route 860 is specified before conditional sub-route 910. User interface 810 enables adding, removing, updating, and/or reviewing of data related to dynamic condition routes, conditional sub-routes, and dynamic conditions as part of editing a roadmap, such as roadmap RM870. User interface 810 can specify a group of one or more conditional sub-routes for a dynamic condition route, where a conditional sub-route can be selected based on one or more specified dynamic conditions. In scenario 800, user interface 810 enables adding, removing, updating, and/or reviewing of data for a conditional sub-route of a dynamic condition route using a dialog, such as dialog 862 or 912. In other scenarios, more, less, and/or different data related to conditional sub-routes that shown in dialog 862 or 912 and/or different user interface controls than dialogs 862, 912 can be used as an interface to data about a conditional sub-route of a dynamic condition route.

FIG. 8 shows that dialog 862 enables "Specification for CSR 860" or conditional sub-route 860 of dynamic condition route "DCR1" of a roadmap named "RM870". Editing area 824 and dialog 862 show that conditional sub-route 860 is a route from "L 360" or lane 360 to "L 354" or lane 354. Dialog 862 indicates that the specification for conditional sub-route 910 is directed for robots of types "Type 1 or Type 2", such as the Type 2 robot shown in editing region 824. The specification for conditional sub-route 860 includes one or more dynamic conditions associated with the sub-route; in this case, the dynamic condition or "DC" named "P360.301" relates to pallet location 360.301 has a status of "FULL" or has an occupied status; and that the "Designated Region(s)" for dynamic condition route DCR1 include pallet location "360.301". That is, dialog 862 shows that dynamic condition route DCR1 classifies pallet location 360.301 as a designated region for potential robotic travel. In scenario 800, robots are directed to sense designated regions for occupancy during travel—then, by specifying pallet location 360.301 as a designated region of dynamic condition route DCR1, robots are thereby instructed to sense an occupied or unoccupied status of pallet location 360.301 along with other designated regions. User interface 810 enables specification of a trajectory of conditional sub-route 860 based on the user drawing the trajectory in editing window 824 using a pointing object; e.g., a finger, stylus, computer mouse.

After data for conditional sub-route 860 is specified using dialog 862, scenario 800 continues with the user utilizing dialog 912 of user interface 810 to specify conditional sub-route 910 of dynamic condition route DCR1 of roadmap RM870. As shown in FIG. 9, editing area 824 and dialog 912 indicate that conditional sub-route 910, like conditional sub-route 860, is a route from "L 360" or lane 360 to "L 354" or lane 354 and is directed for robots of types "Type 1 or Type 2". Dialog 912 for conditional sub-route 910 includes specification of a dynamic condition for the sub-route; specifically, conditional sub-route 910 is associated with the dynamic condition named "P360.301" that has a status of "EMPTY" or unoccupied by a pallet or other object; i.e., pallet location 360.301 has an unoccupied status. Dialog 912 also indicates that "Designated Region(s)" for dynamic condition route DCR1 include pallet location "360.301".

User interface 810 enables specification of a trajectory of route 910 based on the user drawing the trajectory in editing window 824 using a pointing object. In particular, as shown in FIG. 9, selection of a conditional sub-route in editing window 824, e.g., selection of conditional sub-route 860 or conditional sub-route 910, causes a respective dialog; e.g., dialog 862 or dialog 912, to be displayed, thereby enabling review, updating, insertion, and/or removal of data related to the selected conditional sub-route.

Taken together, the specifications of conditional sub-routes 860 and 910 of dynamic condition route DCR1 specify that a robot of a type "Type 1" or "Type 2" is to travel from "L 360" to "L 354" via either conditional sub-route 860 or conditional sub-route 910, depending on a dynamic condition P360.301 related to a status of pallet location 360.301. In particular, conditional sub-route 860 of the dynamic condition route can be used by a Type 1 or Type 2 robot if dynamic condition "P360.301" is "FULL" and where conditional sub-route 910 can be used by a Type 1 or Type 2 robot if dynamic condition "P360.301" is "EMPTY".

In other embodiments, more than two conditional sub-routes are associated with dynamic conditional route DCR1. For example, dynamic conditional route DCR1 can be additional associated with a dynamic condition "P354.002" related to a status of pallet location 354.002, which is directly north of pallet location 360.301. That is, dynamic condition P354.002 can be set to FULL if pallet location 354.002 is occupied by a pallet or other object, such as an obstacle/is an occupied region, and can be set to EMPTY if pallet location 354.002 is unoccupied by a pallet or other object/is an unoccupied region. Then, dynamic conditional route DCR1 can include a third conditional sub-route that uses space of both pallet locations 360.301 and 354.002 when both dynamic conditions P360.301 and P354.002 are empty.

In some of these embodiments, the specifications of conditional sub-routes 860 and 910 can also include a specification of the dynamic conditions associated with the sub-routes that includes reference to dynamic condition P354.002; e.g., the specification of dynamic conditions associated with conditional sub-route 860 can be updated to be "P360.301 FULL AND P.354.002 FULL", conditional sub-route 910 can be updated to be "P360.301 EMPTY AND P.354.002 FULL", and the third conditional sub-route can have a specification of associated dynamic conditions such as "P360.301 EMPTY AND P.354.002 EMPTY". In these embodiments, robots using roadmap RM870 can then sense the full/empty status of both pallet location 360.301 and pallet location 354.002 and provide sensory data indicating the full/empty status of both pallet locations to central planner 312 and/or other robots using roadmap RM870. Then, central planner can use the provided sensory data with the full/empty status of both pallet locations to update dynamic conditions P360.301 and P354.002 according to the received sensory data, and use dynamic conditions P360.301 and P354.002 to select one of the three conditional sub-routes of dynamic condition route DCR1. Other examples are possible as well.

After conditional sub-routes 860 and 910 of dynamic condition route DCR1 are specified by the user, the user utilizes user interface 810 to save roadmap RM870. Subsequently, scenario 800 continues with actions related to the communication flow shown in FIG. 10, in accordance with at least some example embodiments.

Figure 10:
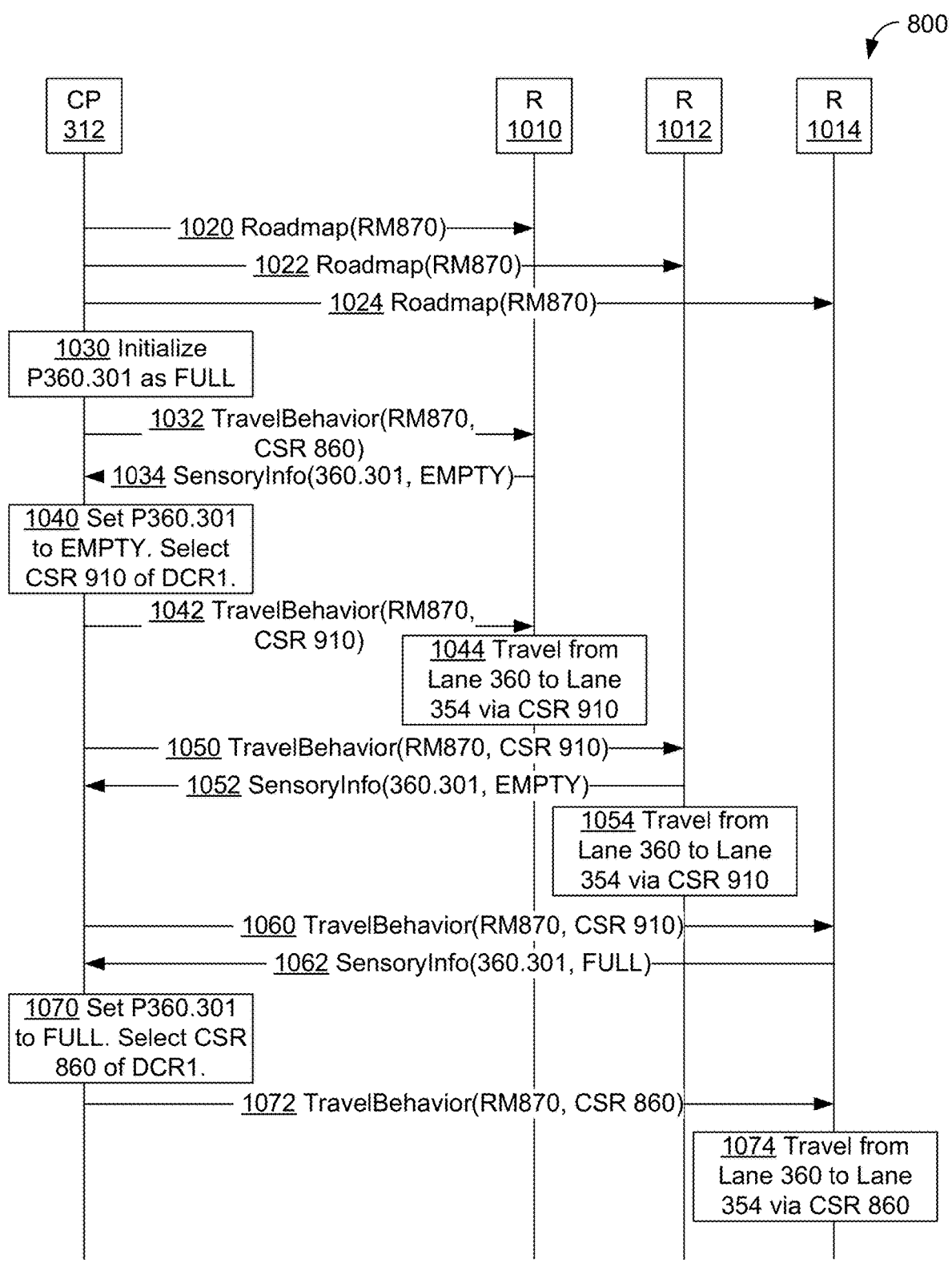
FIG. 10 shows a communication flow for the scenario of FIG. 8, in accordance with at least some example embodiments.

The communication flow shown in FIG. 10 begins with central planner 312 sending roadmap messages 1020, 1022, 1024 to respective robots 1010, 1012, 1014 to provide each of robots 1010, 1012, 1014 with a copy of roadmap RM870. At this stage of scenario 800, roadmap RM870 includes specification of dynamic condition route DCR1 and conditional sub-routes 860 and 910.

Scenario 800 then continues with central planner 312 carrying out the procedures of block 1030 to initialize a dynamic condition P360.301 about pallet location 360.301 to be FULL; that is central planner initially assumes that pallet location 360.301 is full/occupied by a pallet or other object.

Central planner 312 then determines that robot 1012 is to travel from lane 360 to lane 354. Based on the FULL value of dynamic condition P360.301, central planner 312 selects conditional sub-route 860 of dynamic condition route DCR1 for a travel behavior for robot 1010 to travel from lane 360 to lane 354. After selecting conditional sub-route 860, central planner 312 sends travel behavior 1032 to robot 1010 to instruct robot 1010 to refer to roadmap "RM870" to determine conditional sub-route "CSR 860" and then to travel along conditional sub-route 860 from lane 360 to lane 354. Upon reception of travel behavior 1032, robot 1010 approaches a junction of lanes 354 and 360 and uses its sensors to obtain information about designated region/pallet location 360.301 indicating that the designated region/pallet location 360.301 is empty/unoccupied by a pallet or other object. After sensing that pallet location 360.301 is empty, robot 1010 sends sensory information message 1034 to inform central planner 312 that pallet location 360.301 is empty.

Upon reception of sensory information message 1034, central planner 312 uses the procedures of block 1040 to update dynamic condition P360.301 about pallet location 360.301 to be EMPTY, review dynamic condition route DCR1 based on the change in dynamic condition P360.301, and select conditional sub-route "CSR 910" for use by robot 1010 in traveling from lane 360 to lane 354. After selecting conditional sub-route 910, central planner 312 sends travel behavior 1042 to robot 1010 to instruct robot 1010 to refer to roadmap RM870 to determine conditional sub-route "CSR 910" and then to travel along conditional sub-route 910 from lane 360 to lane 354. Upon reception of travel behavior 1042, robot 1010 takes conditional sub-route 910 from lane 360 through the empty pallet location 360.301 to reach lane 354 as indicated by block 1044 of FIG. 10.

Scenario 800 proceeds with central planner 312 determining that robot 1012 is to travel from lane 360 to lane 354. Based on the EMPTY value of dynamic condition P360.301, central planner 312 selects conditional sub-route 910 of dynamic condition route DCR1 for a travel behavior for robot 1012 to travel from lane 360 to lane 354. After selecting conditional sub-route 910, central planner 312 sends travel behavior 1050 to robot 1012 to instruct robot 1012 to refer to roadmap "RM870" to determine conditional sub-route "CSR 910" and then to travel along conditional sub-route 910 from lane 360 to lane 354. Upon reception of travel behavior 1050 robot 1012 approaches a junction of lanes 354 and 360 and uses its sensors to obtain information about designated region/pallet location 360.301 indicating that the designated region/pallet location 360.301 is empty. After sensing that pallet location 360.301 is empty, robot 1012 sends sensory information message 1052 to inform central planner 312 that pallet location 360.301 is (still) empty. After sensing that pallet location 360.301 is empty, robot 1012 takes conditional sub-route 910 from lane 360 through the empty pallet location 360.301 to reach lane 354 as indicated by block 1054 of FIG. 10.

Scenario 800 proceeds with central planner 312 determining that robot 1014 is to travel from lane 360 to lane 354. Based on the EMPTY value of dynamic condition P360.301, central planner 312 selects conditional sub-route 910 of dynamic condition route DCR1 for a travel behavior for robot 1014 to travel from lane 360 to lane 354. After selecting conditional sub-route 910, central planner 312 sends travel behavior 1060 to robot 1014 to instruct robot 1014 to refer to roadmap "RM870" to determine conditional sub-route "CSR 910" and then to travel along conditional sub-route 910 from lane 360 to lane 354. Upon reception of travel behavior 1060 robot 1014 approaches a junction of lanes 354 and 360 and uses its sensors to obtain information about designated region/pallet location 360.301 indicating that the designated region/pallet location 360.301 is full/occupied by a pallet. After sensing that pallet location 360.301 is full, robot 1014 sends sensory information message 1062 to inform central planner 312 that pallet location 360.301 is "FULL".

In other scenarios, central planner 312 determines that pallet location 360.301 is full using other information that sensory information provided by a robot; e.g., central planner 312 directs another robot to place a pallet at pallet location 360.301 and so determines that pallet location 360.301 is full after receiving confirmation that the robot has placed a pallet at pallet location 360.301. In some of these other scenarios, central planner 312 also determines that pallet location 360.301 is empty using other information that sensory information provided by a robot; e.g., central planner 312 directs another robot to pick up a pallet at pallet location 360.301 and so determines that pallet location 360.301 is empty after receiving confirmation that the robot has picked up a pallet at pallet location 360.301. Other techniques for determining full, empty, and/or other statuses of locations; e.g., partially obstructed, are possible as well.

Upon reception of sensory information message 1062, central planner 312 uses the procedures of block 1070 to update dynamic condition P360.301 about pallet location 360.301 to be FULL, review dynamic condition route DCR1 based on the change in dynamic condition P360.301, and select conditional sub-route "CSR 860" for use by robot 1014 in traveling from lane 360 to lane 354. After selecting conditional sub-route 860, central planner 312 sends travel behavior 1072 to robot 1014 to instruct robot 1014 to refer to roadmap RM870 to determine conditional sub-route "CSR 860" and then to travel along conditional sub-route 860 from lane 360 to lane 354. Upon reception of travel behavior 1072, robot 1014 takes conditional sub-route 860 from lane 360 to lane 354 while bypassing the full pallet location 360.301, as indicated by block 1074 of FIG. 10. After robot 1014 has completed taking conditional sub-route 860 from lane 360 to lane 354, scenario 800 can be completed.

Computing Device Architecture

Figure 11A:
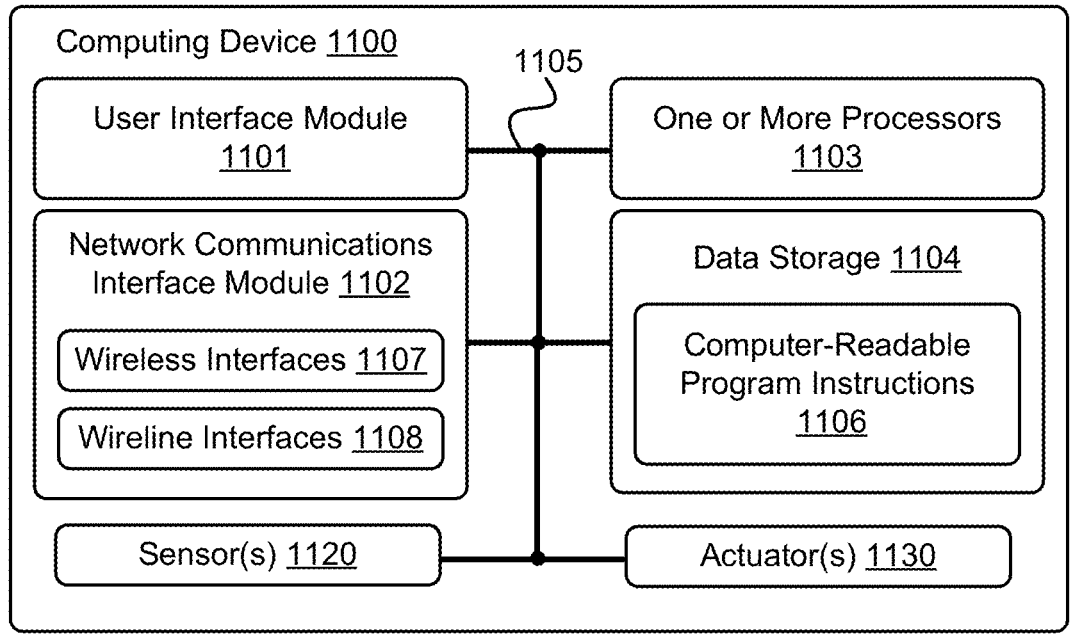
FIG. 11A is a functional block diagram of an example computing device, in accordance with at least some example embodiments.

FIG. 11A is a functional block diagram of an example computing device 1100, in accordance with at least some example embodiments. In particular, computing device 1100 shown in FIG. 11A can be configured to perform at least one function of: a central planner, a motion planner, route planning software, central planning software, motion planning software, robots 240, 242, 244, 246, 248, 412, 512, 610, 612, 710, 720, 1010, 1012, 1014, central planner 312, user interface 810, computing device 1110, and/or one or more functions related to roadmaps 210, RM870, scenarios 200, 400, 500, 600, 700, 800 and/or method 1200. Computing device 1100 may include a user interface module 1101, a network-communication interface module 1102, one or more processors 1103, data storage 1104, one or more sensors 1120, and one or more actuators 1130, all of which may be linked together via a system bus, network, or other connection mechanism 1105.

User interface module 1101 can be operable to send data to and/or receive data from external user input/output devices. For example, user interface module 1101 can be configured to send and/or receive data to and/or from user input devices such as a keyboard, a keypad, a touch screen, a computer mouse, a track ball, a joystick, a camera, a voice recognition module, and/or other similar devices. User interface module 1101 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1101 can also be configured to generate audible output(s), such as a speaker, speaker jack, audio output port, audio output device, earphones, and/or other similar devices.

Network-communications interface module 1102 can include one or more wireless interfaces 1107 and/or one or more wireline interfaces 1108 that are configurable to communicate via a network. Wireless interfaces 1107 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network, such as but not limited to, a wireless local area network (WLAN) and/or a wireless wide area network (WWAN). Wireline interfaces 1108 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as but not limited to, a wireline local area network (LAN) and/or a wireline wide area network (WAN).

In some embodiments, network communications interface module 1102 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 1103 can include one or more general purpose processors, and/or one or more special purpose processors (e.g., digital signal processors, graphics processing units, application specific integrated circuits, etc.). One or more processors 1103 can be configured to execute computer-readable program instructions 1106 that are contained in the data storage 1104 and/or other instructions as described herein.

Data storage 1104 can include one or more computer-readable storage media that can be read and/or accessed by at least one of processors 1103. The one or more computer-readable storage media can include volatile and/or non-volatile storage components, such as optical, magnetic, organic or other memory or disc storage, which can be integrated in whole or in part with at least one of processors 1103. In some embodiments, data storage 1104 can be implemented using a single physical device (e.g., one optical, magnetic, organic or other memory or disc storage unit), while in other embodiments, data storage 1104 can be implemented using two or more physical devices.

Data storage 1104 can include computer-readable program instructions 1106 and perhaps additional data. In some embodiments, data storage 1104 can additionally include storage required to perform at least part of the herein-described methods, procedures, and techniques and/or at least part of the herein-described functionality of devices and networks. In other embodiments, computer-readable program instructions 1106 can include one or more computer-readable program instructions for route planning software, central planning software, and/or motion planning software.

Computing device 1100 can include one or more sensors 1120. Sensor(s) 1120 can be configured to measure conditions in an environment for computing device 1100 and provide data about that environment; e.g., environment 310. For example, sensor(s) 1120 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 1100, such as, but not limited to, a gyroscope, an accelerometer, a Doppler sensor, a Global Positioning System (GPS) device, a sonar sensor, a radar device, a light detection and ranging (LIDAR) device, a laser-displacement sensor, and a compass; (iii) an environmental sensor to obtain data indicative of an environment of computing device 1100, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 1100, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 1120 are possible as well. In some embodiments, some or all of sensors 1120 can be distributed throughout an environment; that is, some of sensors 1120 may not be physically located on computing device 1100.

Computing device 1100 can include one or more actuators 1130 that enable computing device 1100 to initiate movement. For example, actuator(s) 1130 can include or be incorporated with robotic joints connecting robotic limbs to a robotic body. For example, actuator(s) 1130 can include respective robotic hip and robotic shoulder joints connecting respective robotic legs and arms to the robotic body. Further, the actuator(s) 1130 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 1130 can include respective robotic ankle joints connecting the robotic legs to robotic feet and respective robotic wrist joints connecting the robotic arms to robotic hands. In addition, actuator(s) 1130 can include motors for moving the robotic limbs. As such, the actuator(s) 1130 can enable mobility of computing device 1100. Other examples of actuator(s) 1130 are possible as well.

Cloud-Based Servers

Figure 11B:
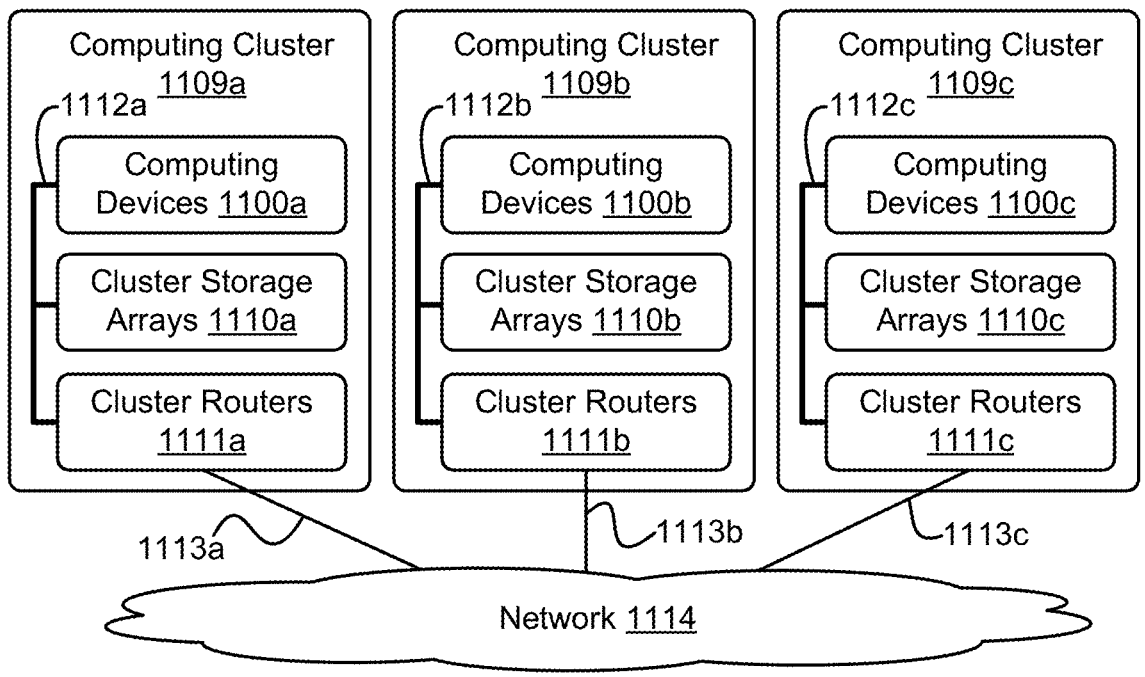
FIG. 11B depicts a network of computing clusters arranged as a cloud-based server system, in accordance with at least some example embodiments.

FIG. 11B depicts a network 1114 of computing clusters 1109a, 1109b, 1109c arranged as a cloud-based server system, in accordance with at least some example embodiments. Computing clusters 1109a, 1109b, 1109c can be cloud-based devices that store program logic and/or data of one or more applications and/or services; e.g., perform at least one function of: a central planner, a motion planner, route planning software, central planning software, motion planning software, robots 240, 242, 244, 246, 248, 412, 512, 610, 612, 710, 720, 1010, 1012, 1014, central planner 312, user interface 810, computing device 1100, and/or one or more functions related to roadmaps 210, RM870, scenarios 200, 400, 500, 600, 700, 800 and/or method 1200.

In some embodiments, computing clusters 1109a, 1109b, 1109c can be a single computing device residing in a single computing center. In other embodiments, computing clusters 1109a, 1109b, 1109c can include multiple computing devices in a single computing center, or even multiple computing devices located in multiple computing centers located in diverse geographic locations. For example, FIG. 11B depicts each of computing clusters 1109a, 1109b, 1109c residing in different physical locations.

In some embodiments, data and services at computing clusters 1109a, 1109b, 1109c can be encoded as computer readable information stored in non-transitory, tangible computer readable media (or computer readable storage media) and accessible by other computing devices. In some embodiments, computing clusters 1109a, 1109b, 1109c can be stored on a single disk drive or other tangible storage media, or can be implemented on multiple disk drives or other tangible storage media located at one or more diverse geographic locations.

FIG. 11B depicts a cloud-based server system in accordance with an example embodiment. In FIG. 11B, functionality of a central planner and/or robot can be distributed among three computing clusters 1109a, 1109b, and 1109c. Computing cluster 1109a can include one or more computing devices 1100a, cluster storage arrays 1110a, and cluster routers 1111a connected by a local cluster network 1112a. Similarly, computing cluster 1109b can include one or more computing devices 1100b, cluster storage arrays 1110b, and cluster routers 1111b connected by a local cluster network 1112b. Likewise, computing cluster 1109c can include one or more computing devices 1100c, cluster storage arrays 1110c, and cluster routers 1111c connected by a local cluster network 1112c.

In some embodiments, each of the computing clusters 1109a, 1109b, and 1109c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1109a, for example, computing devices 1100a can be configured to perform various computing tasks of a central planner, a motion planner, and/or a robot. In one embodiment, the various functionalities of a central planner, a motion planner, and/or a robot can be distributed among one or more computing devices 1100a, 1100b, and 1100c. Computing devices 1100b and 1100c in respective computing clusters 1109b and 1109c can be configured similarly to computing devices 1100a in computing cluster 1109a. On the other hand, in some embodiments, computing devices 1100a, 1100b, and 1100c can be configured to perform different functions.

In some embodiments, computing tasks and stored data associated with a central planner, a motion planner, and/or a robot can be distributed across computing devices 1100a, 1100b, and 1100c based at least in part on the processing requirements of a central planner, a motion planner, and/or a robot, the processing capabilities of computing devices 1100a, 1100b, and 1100c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1110a, 1110b, and 1110c of the computing clusters 1109a, 1109b, and 1109c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a central planner, a motion planner, and/or a robot can be distributed across computing devices 1100a, 1100b, and 1100c of computing clusters 1109a, 1109b, and 1109c, various active portions and/or backup portions of these components can be distributed across cluster storage arrays 1110a, 1110b, and 1110c. For example, some cluster storage arrays can be configured to store one portion of the data of a central planner, a motion planner, and/or a robot can, while other cluster storage arrays can store other portion(s) of data of a central planner, a motion planner, and/or a robot. Additionally, some cluster storage arrays can be configured to store backup versions of data stored in other cluster storage arrays.

The cluster routers 1111a, 1111b, and 1111c in computing clusters 1109a, 1109b, and 1109c can include networking equipment configured to provide internal and external communications for the computing clusters. For example, the cluster routers 1111a in computing cluster 1109a can include one or more internet switching and routing devices configured to provide (i) local area network communications between the computing devices 1100a and the cluster storage arrays 1110a via the local cluster network 1112a, and (ii) wide area network communications between the computing cluster 1109a and the computing clusters 1109b and 1109c via the wide area network connection 1113a to network 1114. Cluster routers 1111b and 1111c can include network equipment similar to the cluster routers 1111a, and cluster routers 1111b and 1111c can perform similar networking functions for computing clusters 1109*b* and 1109*b* that cluster routers 1111*a* perform for computing cluster 1109*a*.

In some embodiments, the configuration of the cluster routers 1111*a*, 1111*b*, and 1111*c* can be based at least in part on the data communication requirements of the computing devices and cluster storage arrays, the data communications capabilities of the network equipment in the cluster routers 1111*a*, 1111*b*, and 1111*c*, the latency and throughput of local networks 1112*a*, 1112*b*, 1112*c*, the latency, throughput, and cost of wide area network links 1113*a*, 1113*b*, and 1113*c*, and/or other factors that can contribute to the cost, speed, fault-tolerance, resiliency, efficiency and/or other design goals of the moderation system architecture.

Example Methods of Operation

Figure 12:
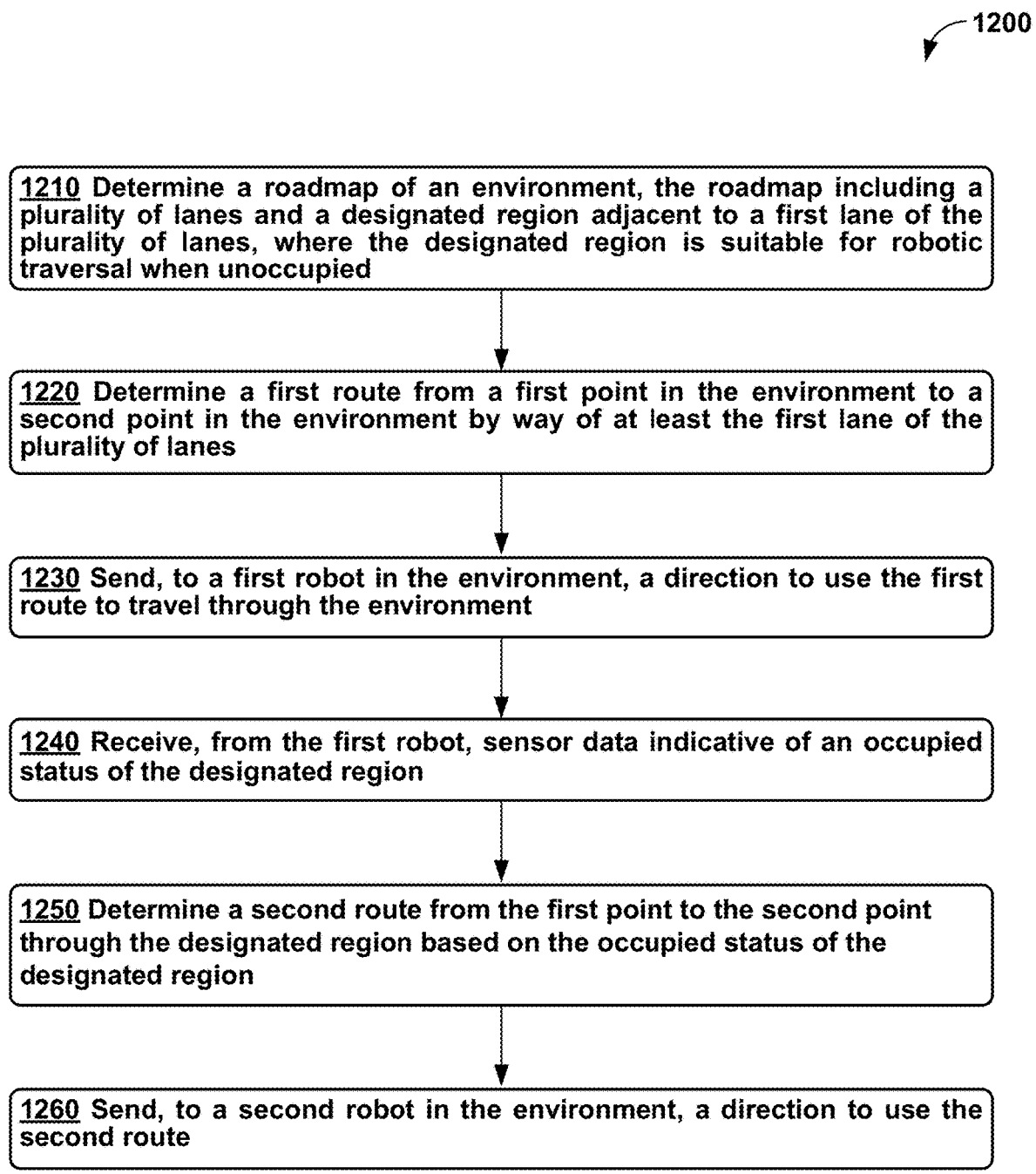
FIG. 12 is a flowchart of a method, in accordance with at least some example embodiments.

FIG. 12 is a flowchart of a method 1200, in accordance with at least some example embodiments. Method 1200 can be performed by a computing device, such as computing device 1100 discussed above. In at least some examples, the computing device has hardware and/or software that, when executed, causes the computing device to perform at least some of the herein-described functionality of a central planner.

Method 1200 can begin at block 1210, where the computing device can determine a roadmap of an environment, where the roadmap can include a plurality of lanes and a designated region adjacent to a first lane of the plurality of lanes, where the designated region is suitable for robotic traversal when unoccupied, such as discussed herein at least in the context of FIGS. 1-10. In some embodiments, determining the roadmap of the environment includes: providing a graphical user interface configured for specifying the roadmap; and receiving, via the graphical user interface, a specification of the roadmap that includes specification of the designated region, such as discussed herein at least in the context of FIGS. 8 and 9.

At block 1220, the computing device can determine a first route from a first point in the environment to a second point in the environment by way of at least the first lane of the plurality of lanes, such as discussed herein at least in the context of FIGS. 1-10.

At block 1230, the computing device can send a direction to use the first route to travel through the environment to a first robot in the environment, such as discussed herein at least in the context of FIGS. 1-10.

At block 1240, the computing device can receive, from the first robot, sensor data indicative of an occupied status of the designated region, such as discussed herein at least in the context of FIGS. 1 and 8-10. In some embodiments, receiving the sensor data includes: receiving, from the first robot, sensor data indicative that the occupied status of the designated region is the empty status, where the sensor data is sent after the first robot has determined that the designated region is empty using one or more sensors of the first robot, such as discussed herein at least in the context of FIGS. 1 and 8-10. In other embodiments, a designated region includes a pallet drop-off location for placing one or more pallets, and where the occupied status of the designated region is based on whether at least one pallet is at the pallet drop-off location, such as discussed herein at least in the context of FIGS. 1 and 4.

At block 1250, the computing device can determine a second route from the first point to the second point through the designated region based on the occupied status of the designated region, such as discussed herein at least in the context of FIGS. 1 and 8-10. In some embodiments, the occupied status of the designated region is selected from an empty status and a full status, where the occupied status of the designated region includes the empty status, and where the first route is not through the designated region, such as discussed herein at least in the context of FIGS. 1 and 8-10. In other embodiments, the designated region includes an intersection of the first lane and a second lane of the plurality of lanes, where sole use of the first route enables only one robot to travel through the intersection at one time, and where use of both the first route and the second route enables two or more robots to travel through the intersection at one time, such as discussed herein at least in the context of FIG. 2.

In other embodiments, the designated region is also adjacent to the second point; then determining the second route can include: receiving an indication that a first pallet has been placed at the second point; and determining a direction to travel along the second route through the designated region to pick up the first pallet, such as discussed herein at least in the context of FIGS. 1 and 4. In particular of these embodiments, the first route places the second robot at a first pose at the second point, where the second robot is unable to pick up the first pallet at the first pose, and where the second route places the second robot in a second pose that enables the second robot to pick up the first pallet, such as discussed herein at least in the context of FIG. 4.

In even other embodiments, the roadmap is configured to store a current occupied status of the designated region and a plurality of predetermined curves; the plurality of predetermined curves including at least a first curve that avoids the designated region and a second curve that traverses the designated region, such as discussed herein at least in the context of FIGS. 8-10. In some of these embodiments, the occupied status of the designated region includes an empty status; then determining the second route can include: setting the current occupied status of the designated region to the empty status based on the received sensor data indicative of the occupied status of the designated region; and selecting the second curve as part of the second route based on the current occupied status of the designated region including the empty status, such as discussed herein at least in the context of FIGS. 8-10. In other of these embodiments, method 1200 further includes: receiving subsequent sensor data from a robot in the environment, the subsequent sensor data indicating that the occupied status of the designated region includes a full status; after receiving the subsequent sensor data, setting the current occupied status of the designated region to the full status based on the subsequent sensor data; receiving a request to provide a route through the environment; and selecting the first curve as part of the requested route through the environment based on the current occupied status of the designated region including the full status, such as discussed herein at least in the context of FIGS. 8-10.

At block 1260, the computing device can send a direction to use the second route to a second robot in the environment, such as discussed herein at least in the context of FIGS. 1 and 8-10. In some embodiments, the two or more robots are of two or more different sizes, such as discussed herein at least in the context of FIGS. 1 and 6.

In some embodiments, method 1200 further includes: after receiving the sensor data from the first robot, sending, to the first robot, a direction to use the second route, such as discussed herein at least in the context of FIGS. 1 and 8-10. In other embodiments, method 1200 further includes: sending, to the second robot, the sensor data indicative that the occupied status of the designated region is the empty status, such as discussed herein at least in the context of FIG. 2. In still other embodiments, method 1200 further includes: sending, to the first robot, a direction to travel along the first route through the intersection during a particular time interval; and sending, to the second robot, a direction to travel along the second route through the intersection during the particular time interval, such as discussed herein at least in the context of FIGS. 1 and 6. In even other embodiments, the roadmap includes a second designated region associated with the first lane, the occupied status of the second designated region is selected from an empty status and a full status, the first route is through the second designated region; then method 1200 can further include: receiving, from the first robot, sensor data indicative that the occupied status of the second designated region is the full status; where determining the second route includes determining a route that avoids the second designated region, such as discussed herein at least in the context of FIGS. 1, 5, and 8-10. In particular of these embodiments, the second designated region includes part of the first lane, and where the second designated region is occupied by an obstacle, such as discussed herein at least in the context of FIGS. 1, 5, and 8-10.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
    determining a roadmap of an environment, the roadmap comprising a plurality of predefined lanes and a designated region adjacent to a first lane of the plurality of predefined lanes, wherein the designated region is predefined, is suitable for robotic traversal when unoccupied, delineates an extent of deviation permitted by a robot from the first lane, and is associated with an occupied status in the roadmap;
    determining, by a control system, a first route from a first point in the environment to a second point in the environment by way of at least the first lane of the plurality of predefined lanes;
    sending, by the control system and to a first robot in the environment, a direction to use the first route to travel through the environment;
    receiving, from the first robot and by the control system, sensor data (i) obtained while the first robot is using the first route to travel through the environment and (ii) representing the designated region;
    determining, by the control system, the occupied status of the designated region by processing the sensor data received from the first robot;
    based on determining the occupied status of the designated region, updating, by the control system, the roadmap to indicate the occupied status of the designated region;
    determining, by the control system, a second route from the first point to the second point through the designated region based on the roadmap as updated indicating the occupied status of the designated region; and sending, by the control system and to a second robot in the environment, a direction to use the second route.

2. The method of claim 1, further comprising:
after receiving the sensor data from the first robot, sending, to the first robot, a direction to use the second route.

3. The method of claim 1, wherein the occupied status of the designated region is selected from an empty status and a full status, and wherein the first route is not through the designated region, and wherein determining the occupied status of the designated region comprises:
determining that the occupied status of the designated region is the empty status by processing the sensor data received from the first robot.

4. The method of claim 3, further comprising:
sending, to the second robot, the sensor data received from the first robot.

5. The method of claim 3, wherein the designated region comprises an intersection of the first lane and a second lane of the plurality of predefined lanes, wherein sole use of the first route enables only one robot to travel through the intersection at one time, and wherein use of both the first route and the second route enables two or more robots to travel through the intersection at one time.

6. The method of claim 5, further comprising:
sending, to the first robot, a direction to travel along the first route through the intersection during a particular time interval; and
sending, to the second robot, a direction to travel along the second route through the intersection during the particular time interval.

7. The method of claim 5, wherein the two or more robots are of two or more different sizes.

8. The method of claim 3, further comprising:
receiving, from a third robot, subsequent sensor data indicative of the occupied status of the designated region;
determining that the occupied status of the designated region is the full status based on the subsequent sensor data; and
sending a direction to the third robot to travel along the first route.

9. The method of claim 1, wherein determining the roadmap of the environment comprises:
providing a graphical user interface configured for specifying the roadmap; and
receiving, via the graphical user interface, a specification of the roadmap that includes specification of the designated region.

10. The method of claim 1, wherein the roadmap comprises a second designated region associated with the first lane, wherein the occupied status of the second designated region is selected from an empty status and a full status, wherein the first route is through the second designated region, and wherein the method further comprises:
receiving, from the first robot, sensor data indicative that the occupied status of the second designated region is the full status; and
wherein determining the second route comprises determining a route that avoids the second designated region.

11. The method of claim 10, wherein the second designated region includes part of the first lane, and wherein the second designated region is occupied by an obstacle.

12. The method of claim 1, wherein the designated region is also adjacent to the second point, and wherein determining the second route comprises:
receiving an indication that a first pallet has been placed at the second point; and
determining a direction to travel along the second route through the designated region to pick up the first pallet.

13. The method of claim 12, wherein the first route places the second robot at a first pose at the second point, wherein the second robot is unable to pick up the first pallet at the first pose, and wherein the second route places the second robot in a second pose that enables the second robot to pick up the first pallet.

14. The method of claim 1, wherein the designated region includes a pallet drop-off location for placing one or more pallets, and wherein the occupied status of the designated region is based on whether at least one pallet is at the pallet drop-off location.

15. The method of claim 1, wherein the roadmap is configured to store the occupied status associated with the designated region and a plurality of predetermined curves, the plurality of predetermined curves comprising at least a first curve that avoids the designated region and a second curve that traverses the designated region.

16. The method of claim 15, wherein the occupied status of the designated region comprises an empty status, and wherein:
updating the roadmap to indicate the occupied status of the designated region comprises setting the occupied status of the designated region to the empty status based on the sensor data received from the first robot; and
determining the second route comprises selecting the second curve as part of the second route based on the roadmap as updated indicating that the occupied status of the designated region is the empty status.

17. The method of claim 15, further comprising:
receiving subsequent sensor data from at least one robot in the environment, the subsequent sensor data indicating that the occupied status of the designated region is a full status;
after receiving the subsequent sensor data, updating the roadmap by setting the occupied status of the designated region to the full status based on the subsequent sensor data;
receiving a request to provide a route through the environment; and
selecting the first curve as part of the requested route through the environment based on the occupied status of the designated region comprising the full status.

18. The method of claim 1, further comprising:
determining, based on the roadmap as updated indicating the occupied status of the designated region, a third route that passes adjacent to the second route; and
sending, to at least one other robot in the environment, a direction to use the third route to pass the second robot while the second robot occupies the designated region along the second route.

19. A computing device, comprising a processor, wherein the computing device is configured to:
determine a roadmap of an environment, the roadmap comprising a plurality of predefined lanes and a designated region adjacent to a first lane of the plurality of predefined lanes, wherein the designated region is predefined, is suitable for robotic traversal when unoccupied, delineates an extent of deviation permitted by a robot from the first lane, and is associated with an occupied status in the roadmap;

determine a first route from a first point in the environment to a second point in the environment by way of at least the first lane of the plurality of predefined lanes;

send, to a first robot in the environment, a direction to use the first route to travel through the environment;

receive, from the first robot, sensor data (i) obtained while the first robot is using the first route to travel through the environment and (ii) representing the designated region;

determine the occupied status of the designated region by processing the sensor data received from the first robot;

based on determining the occupied status of the designated region, update the roadmap to indicate the occupied status of the designated region;

determine a second route from the first point to the second point through the designated region based on the roadmap as updated indicating the occupied status of the designated region; and send, to a second robot in the environment, a direction to use the second route.

20. A non-transitory computer readable medium having stored thereon instructions, that when executed by one or more processors of a computing device, cause the computing device to perform functions comprising:

determining a roadmap of an environment, the roadmap comprising a plurality of predefined lanes and a designated region adjacent to a first lane of the plurality of predefined lanes, wherein the designated region is predefined, is suitable for robotic traversal when unoccupied, delineates an extent of deviation permitted by a robot from the first lane, and is associated with an occupied status in the roadmap;

determining a first route from a first point in the environment to a second point in the environment by way of at least the first lane of the plurality of predefined lanes;

sending, to a first robot in the environment, a direction to use the first route to travel through the environment;

receiving, from the first robot, sensor data (i) obtained while the first robot is using the first route to travel through the environment and (ii) representing the designated region;

determining the occupied status of the designated region by processing the sensor data received from the first robot;

based on determining the occupied status of the designated region, updating the roadmap to indicate the occupied status of the designated region;

determining a second route from the first point to the second point through the designated region based on the roadmap as updated indicating the occupied status of the designated region; and sending, to a second robot in the environment, a direction to use the second route.

* * * * *